US011316266B2

United States Patent
Choe et al.

(10) Patent No.: US 11,316,266 B2
(45) Date of Patent: Apr. 26, 2022

(54) ELECTRONIC DEVICE HAVING STRUCTURE FOR ELIMINATING PARASITIC EMISSION

(71) Applicant: Samsung Electronics Co., Ltd., Suwon-si (KR)

(72) Inventors: Jaewon Choe, Suwon-si (KR); Jiho Kim, Suwon-si (KR); Moohyun Roh, Suwon-si (KR); Gyubok Park, Suwon-si (KR); Kyungmoon Seol, Suwon-si (KR); Seongyong An, Suwon-si (KR); Kyihyun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/106,778

(22) Filed: Nov. 30, 2020

(65) Prior Publication Data

US 2021/0167492 A1 Jun. 3, 2021

(30) Foreign Application Priority Data

Dec. 2, 2019 (KR) .................. 10-2019-0158528

(51) Int. Cl.
*H01Q 1/52* (2006.01)
*H01Q 1/24* (2006.01)
*H04M 1/02* (2006.01)

(52) U.S. Cl.
CPC ............. *H01Q 1/526* (2013.01); *H01Q 1/243* (2013.01); *H04M 1/0266* (2013.01); *H04M 1/0277* (2013.01)

(58) Field of Classification Search
CPC combination set(s) only.
See application file for complete search history.

(56) References Cited

U.S. PATENT DOCUMENTS 10,700,415 B2 * 6/2020 Shin .................... H04M 1/0266
2008/0062661 A1 * 3/2008 Choi ..................... H05K 1/147
361/752

(Continued)

FOREIGN PATENT DOCUMENTS

KR 10-2018-0105356 A 9/2018
KR 10-2019-0024178 A 3/2019

(Continued)

OTHER PUBLICATIONS

International Search Report dated Mar. 16, 2021, issued in International Application No. PCT/KR2020/017292.

*Primary Examiner* — Junpeng Chen
(74) *Attorney, Agent, or Firm* — Jefferson IP Law, LLP

(57) ABSTRACT

An electronic device for minimizing parasitic emission is provided. The electronic device includes a housing including a front cover, a rear cover located on the opposite side of the front cover, and a lateral member surrounding a space between the front cover and the rear cover, the lateral member having a first conductive portion formed on at least a portion thereof, a support member disposed in the space of the housing and including a second conductive portion having therein at least one opening, a display including a conductive sheet that is disposed between the front cover and the support member so as to be visible from an outside through at least a part of the front cover and is disposed to face the support member, and a wireless communication circuit electrically connected to the first conductive portion. The conductive sheet includes a first portion, a second portion disposed adjacent to the first portion, and a coupling that is partly connected between the first portion and the second portion. In case the front cover is viewed from above, the coupling is disposed at a position overlapping the opening.

20 Claims, 16 Drawing Sheets

(56) References Cited

U.S. PATENT DOCUMENTS

| | | | |
|---|---|---|---|
| 2017/0142823 A1* | 5/2017 | Shim | G06F 1/1626 |
| 2017/0207516 A1* | 7/2017 | Koo | H01Q 9/42 |
| 2018/0269561 A1 | 9/2018 | Kim et al. | |
| 2019/0058244 A1* | 2/2019 | Kim | H01Q 1/48 |
| 2019/0074576 A1 | 3/2019 | Bae et al. | |
| 2019/0163003 A1* | 5/2019 | Kim | G02F 1/1333 |
| 2019/0252766 A1 | 8/2019 | Jeon et al. | |
| 2019/0260127 A1* | 8/2019 | Shi | H01Q 5/371 |
| 2020/0235463 A1 | 7/2020 | Cha et al. | |

FOREIGN PATENT DOCUMENTS

| | | |
|---|---|---|
| KR | 10-2019-0027625 A | 3/2019 |
| KR | 10-2019-0098527 A | 8/2019 |

\* cited by examiner

ELECTRONIC DEVICE HAVING STRUCTURE FOR ELIMINATING PARASITIC EMISSION

CROSS-REFERENCE TO RELATED APPLICATION(S)

This application is based on and claims priority under 35 U.S.C. § 119 of a Korean patent application number 10-2019-0158528, filed on Dec. 2, 2019, in the Korean Intellectual Property Office, the disclosure of which is incorporated by reference herein in its entirety.

BACKGROUND

1 Field

The disclosure relates to an electronic device having a structure for eliminating parasitic emission.

2 Description of Related Art

As functional gaps in recent electronic devices are remarkably reduced among manufacturers, the electronic devices are gradually being made slimmer to satisfy consumer interest, and are developed to have increased rigidity, to improve a design aspect thereof, and simultaneously to obtain a slim structure thereof.

The electronic devices may include at least one antenna for supporting wireless communication services in various frequency bands. The at least one antenna may be disposed such that excellent radiation performance is realized without the influence of surrounding structures or electronic components disposed in the internal space of the electronic device.

SUMMARY

According to various embodiments, the electronic device may include a conductive lateral member formed of a metal as a constituent element for the purpose of reinforcing rigidity and imparting a beautiful appearance. At least a part of the conductive lateral member may be segmented into unit conductive portions through at least one non-conductive portion and may be electrically connected to a wireless communication circuit, and thereby can be used as an antenna radiator for transmitting and/or receiving a wireless signal.

The electronic device may include a plate-type support member that at least partly includes a conductive portion. The support member may be used to support a display disposed in the electronic device. The display may include a conductive sheet disposed on the rear surface thereof for the purpose of blocking noise or dissipating heat. The conductive sheet is disposed parallel to the conductive support member, whereby a parasitic resonance frequency is established according to a parallel waveguide transmission line theory. This unnecessary parasitic resonance frequency is included in an in-band of an antenna when some of the conductive portions of the conductive lateral member are used as antennas. Thereby, the operating frequency band of the antenna may be changed, or radiation efficiency may be reduced. Therefore, the conductive sheet is separated into at least two portions through at least one slit that is formed to cross from one edge to the other edge, whereby the parasitic resonance frequency is set in an out-band to prevent a drop in antenna radiation performance.

However, among the at least two conductive sheet portions having an electric insulating structure using the slit, a ground connection structure is provided for only one conductive sheet portion, and the remaining portion is electrically open. Due to absence of the ground, a malfunction such as flickering may be caused at the display.

Aspects of the disclosure are to address at least the above-mentioned problems and/or disadvantages and to provide at least the advantages described below. Accordingly, an aspect of the disclosure is to provide an electronic device having a structure for eliminating parasitic emission.

Another aspect of the disclosure is to provide an electronic device having a structure for eliminating parasitic emission, capable of helping to improve the radiation performance of an antenna while preventing malfunction of a display.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front cover, a rear cover located on an opposite side of the front cover, and a lateral member surrounding a space between the front cover and the rear cover, the lateral member having a first conductive portion formed on at least a portion thereof, a support member disposed in the space of the housing including a second conductive portion having therein at least one opening, a display configured to include a conductive sheet that is disposed between the front cover and the support member so as to be visible from an outside through at least a part of the front cover and is disposed to face the support member, and a wireless communication circuit electrically connected to the first conductive portion. The conductive sheet includes a first portion, a second portion disposed adjacent to the first portion, and a coupling that is partly connected between the first portion and the second portion. In case the front cover is viewed from above, the coupling is disposed at a position overlapping the opening.

In accordance with another aspect of the disclosure, an electronic device is provided. The electronic device includes a housing including a front cover, a rear cover located on an opposite side of the front cover, and a lateral member surrounding a space between the front cover and the rear cover, the lateral member having a first conductive portion formed on at least a portion thereof, a support member disposed in the space of the housing and including a second conductive portion having therein at least one opening, a display disposed between the front cover and the support member to be visible from an outside through at least a part of the front cover and including a display panel, a conductive sheet that is disposed on a rear surface of the display panel and is disposed to be divided into a first portion and a second portion through a slit, and a flexible printed circuit board (FPCB) that extends from the display panel and is disposed so as to be folded to face at least a part of the conductive sheet, and a wireless communication circuit electrically connected to the first conductive portion. The FPCB is disposed to overlap at least partial regions of the first portion and the second portion in case the front cover is viewed from above, and the first portion and the second portion are electrically connected to a ground of the FPCB through the regions disposed to overlap each other.

In accordance with another aspect of the disclosure, an electronic device is provided. The electronic device includes a housing including a front cover, a rear cover located on an opposite side of the front cover, and a lateral member surrounding a space between the front cover and the rear cover, the lateral member having a first conductive portion formed on at least a portion thereof, a support member disposed in the space of the housing and including a second conductive portion having therein at least one opening, a display disposed between the front cover and the support member so as to be visible from an outside through at least a part of the front cover and including a display panel, a conductive sheet that is disposed on a rear surface of the display panel, and a flexible printed circuit board (FPCB) that extends from the display panel, is disposed so as to be folded to face a rear surface of the display, and includes a ground layer having substantially a same size as a remaining region of the display panel excluding the conductive sheet, and a wireless communication circuit electrically connected to the first conductive portion. The FPCB is disposed side by side to be adjacent to the conductive sheet in case the front cover is viewed from above, the FPCB being electrically connected to the conductive sheet through an electric connecting member that extends from the FPCB.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
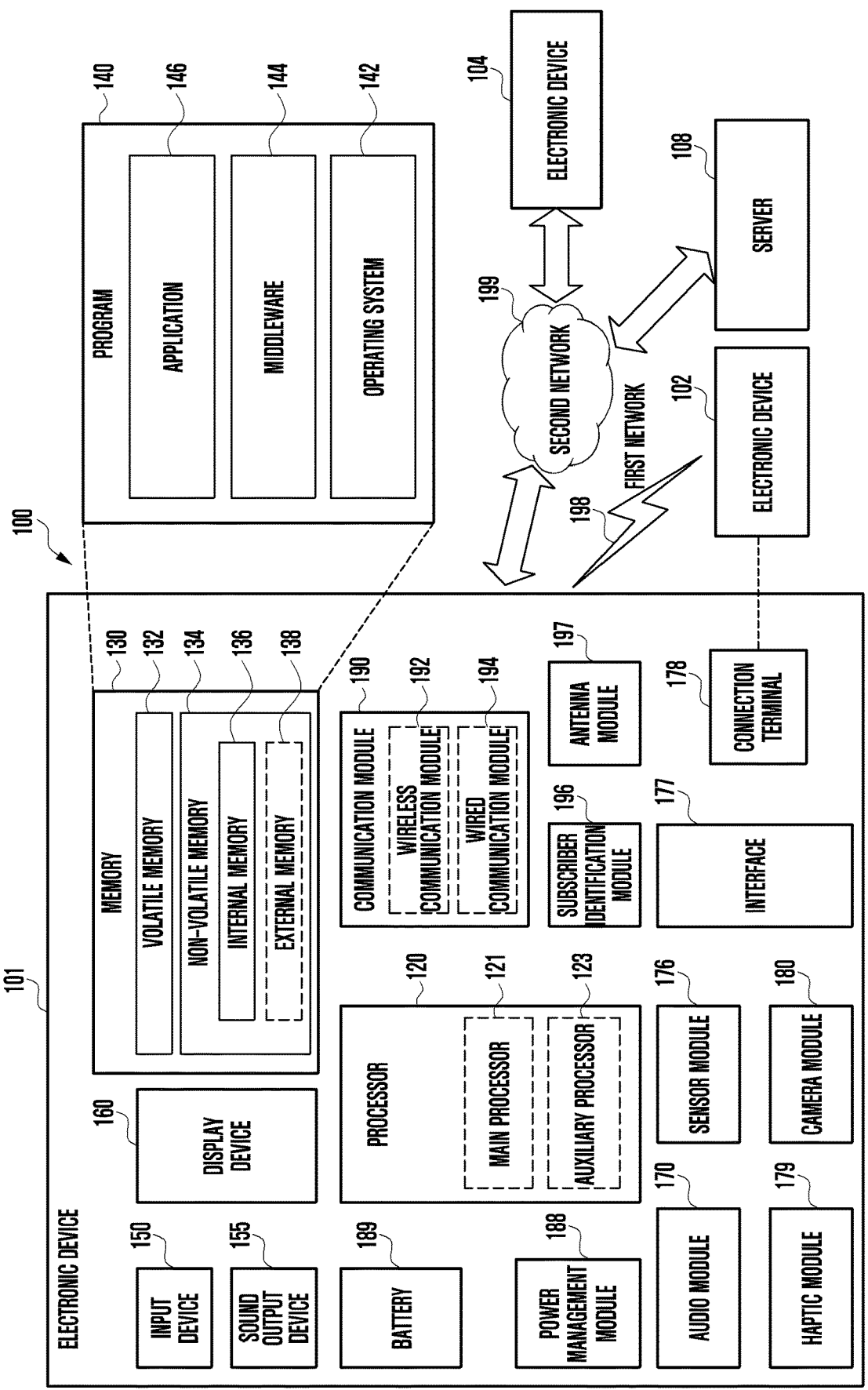
FIG. 1 is a block diagram of an electronic device in a network environment according to various embodiments of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190 (e.g., a transceiver), a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
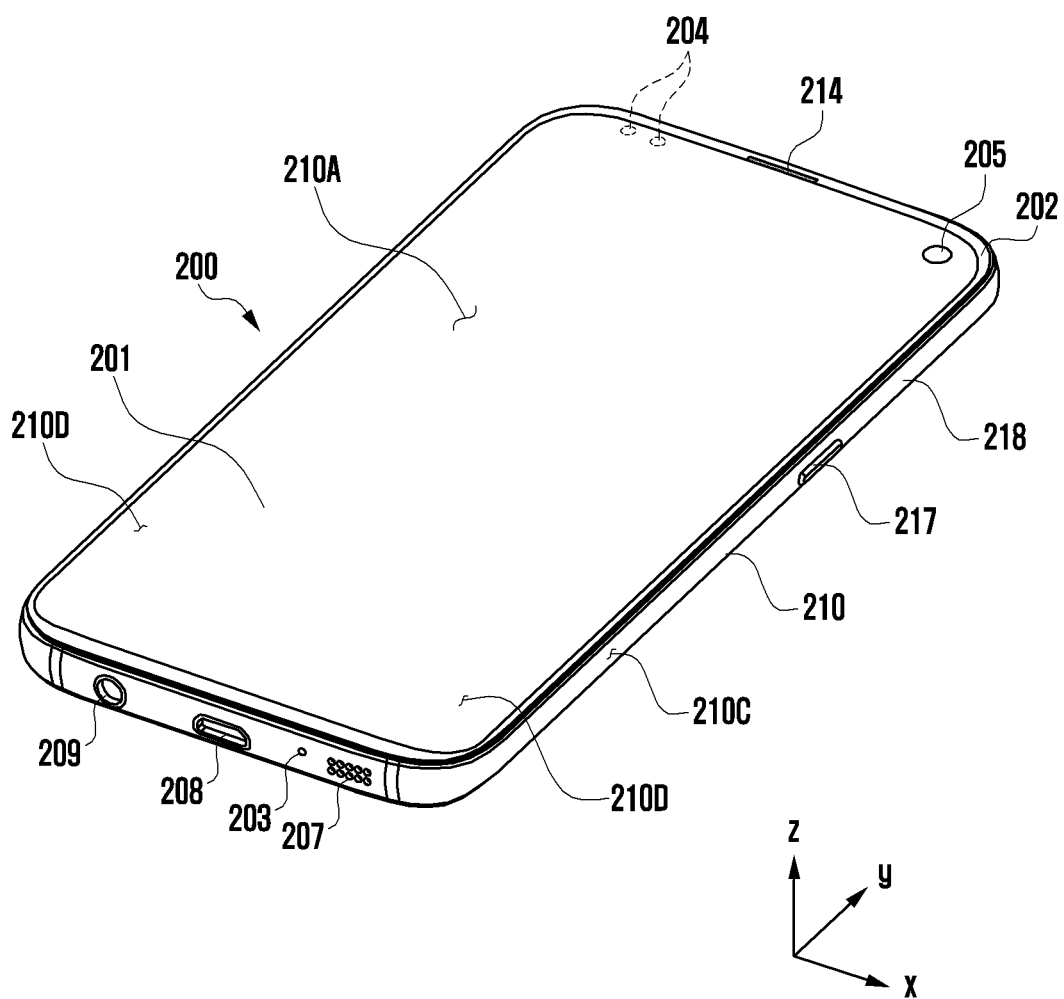
FIG. 2A is a perspective view of an electronic device according to various embodiments of the disclosure.
Figure 2B:
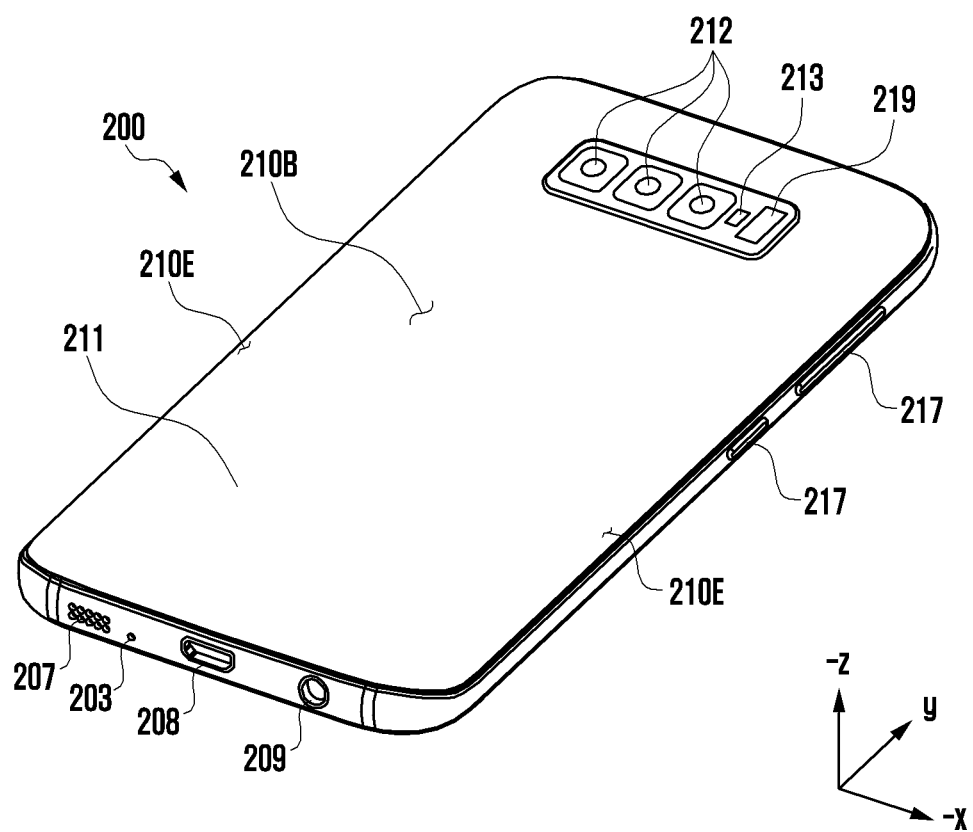
FIG. 2B is a rear perspective view of the electronic device according to various embodiment of the disclosure.

FIG. 2A illustrates a perspective view showing a front surface of a mobile electronic device 200 according to an embodiment of the disclosure, and FIG. 2B illustrates a perspective view showing a rear surface of the mobile electronic device 200 shown in FIG. 2A.

Referring to FIGS. 2A and 2B, the mobile electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the mobile electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The mobile electronic device 200 may include at least one of a display 201, audio modules 203, 207 and 214, sensor modules 204 and 219, camera modules 205, 212 and 213, a key input device 217, a light emitting device, and connector holes 208 and 209. The mobile electronic device 200 may omit at least one (e.g., the key input device 217 or the light emitting device) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. Outlines (i.e., edges and corners) of the display 201 may have substantially the same form as those of the front plate 202. The spacing between the outline of the display 201 and the outline of the front plate 202 may be substantially unchanged in order to enlarge the exposed area of the display 201.

A recess or opening may be formed in a portion of a display area of the display 201 to accommodate at least one of the audio module 214, the sensor module 204, the camera module 205, and the light emitting device. At least one of the audio module 214, the sensor module 204, the camera module 205, the fingerprint sensor (not shown), and the light emitting element may be disposed on the back of the display area of the display 201. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

The audio modules 203, 207 and 214 may correspond to a microphone hole 203 and speaker holes 207 and 214, respectively. The microphone hole 203 may contain a microphone disposed therein for acquiring external sounds and, in a case, contain a plurality of microphones to sense a sound direction. The speaker holes 207 and 214 may be classified into an external speaker hole 207 and a call receiver hole 214. The microphone hole 203 and the speaker holes 207 and 214 may be implemented as a single hole, or a speaker (e.g., a piezo speaker) may be provided without the speaker holes 207 and 214.

The sensor modules 204 and 219 may generate electrical signals or data corresponding to an internal operating state of the mobile electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device 205 disposed on the first surface 210A of the electronic device 200, and a second camera device 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the electronic device 200.

The key input device 217 may be disposed on the lateral surface 210C of the housing 210. The mobile electronic device 200 may not include some or all of the key input device 217 described above, and the key input device 217 which is not included may be implemented in another form such as a soft key on the display 201. The key input device 217 may include the sensor module disposed on the second surface 210B of the housing 210.

The light emitting device may be disposed on the first surface 210A of the housing 210. For example, the light emitting device may provide status information of the electronic device 200 in an optical form. The light emitting device may provide a light source associated with the operation of the camera module 205. The light emitting device may include, for example, a light emitting diode (LED), an IR LED, or a xenon lamp.

The connector holes 208 and 209 may include a first connector hole 208 adapted for a connector (e.g., a USB connector) for transmitting and receiving power and/or data to and from an external electronic device, and/or a second connector hole 209 adapted for a connector (e.g., an earphone jack) for transmitting and receiving an audio signal to and from an external electronic device.

Some sensor modules 205 of camera modules 205 and 212, some sensor modules 204 of sensor modules 204 and 219, or an indicator may be arranged to be exposed through a display 201. For example, the camera module 205, the sensor module 204, or the indicator may be arranged in the internal space of an electronic device 200 so as to be brought into contact with an external environment through an opening of the display 201, which is perforated up to a front plate 202. In another embodiment, some sensor modules 204 may be arranged to perform their functions without being visually exposed through the front plate 202 in the internal space of the electronic device. For example, in this case, an area of the display 201 facing the sensor module may not require a perforated opening.

Figure 3:
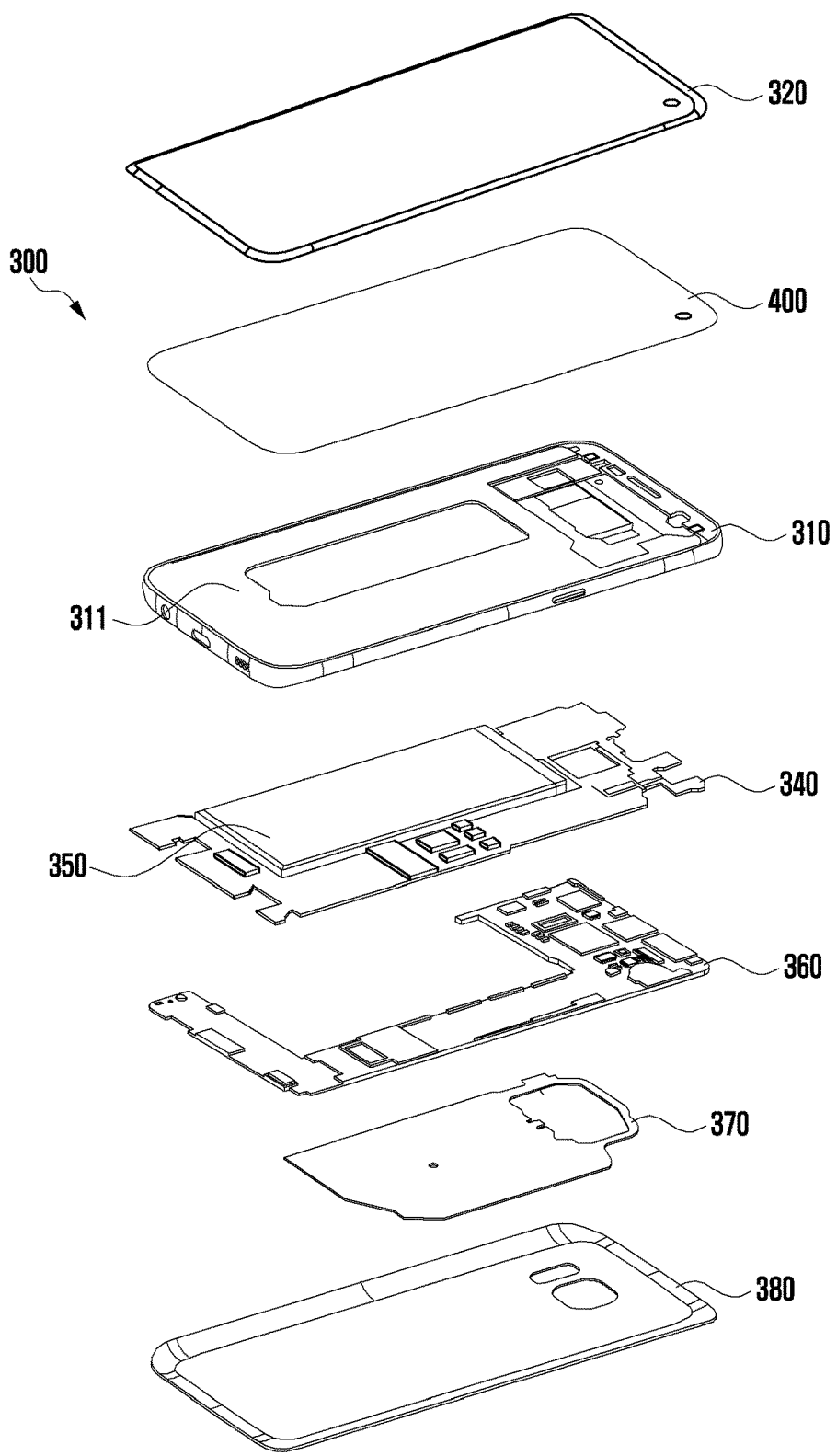
FIG. 3 is an exploded perspective view of an electronic device according to various embodiments of the disclosure.

FIG. 3 illustrates an exploded perspective view showing a mobile electronic device shown in FIG. 1 according to an embodiment of the disclosure.

Referring to FIG. 3, a mobile electronic device 300 may include a lateral bezel structure 310, a first support member 311 (e.g., a bracket), a front plate 320, a display 400, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the electronic device 101 and mobile electronic device 200 shown in FIG. 1 or FIGS. 2A and 2B, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 400 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4A:
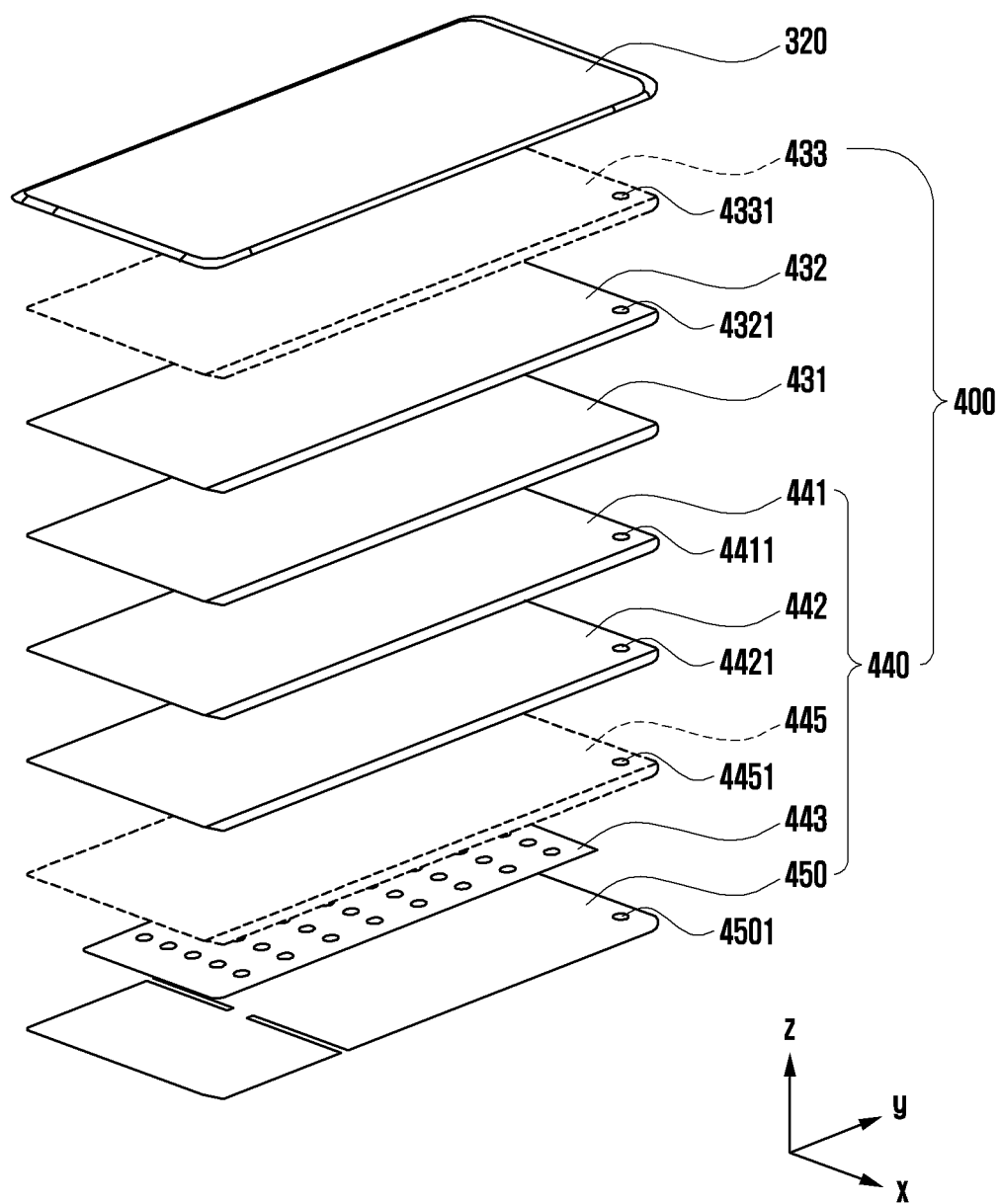
FIG. 4A is an exploded perspective view of a display according to various embodiments of the disclosure.

FIG. 4A is an exploded perspective view of a display according to various embodiments of the disclosure.

A display 400 of FIG. 4A may be similar to the display 201 of FIG. 2A in at least some aspects, but other embodiments of the display are also included.

Referring to FIG. 4A, the display 400 may include a polarizer (POL) 432 (e.g., a polarizing film) that is disposed on a rear surface of a front cover 320 (e.g., a front plate, a glass plate, a first cover member, or a cover member) and is laminated thereto using an adhesive member, a display panel 431, and at least one subsidiary material layer 440 that is adhered to a rear surface of the display panel 431. According to an embodiment, the adhesive member may include an optical clear adhesive (OCA), a pressure-sensitive adhesive (PSA), a heat-reactive adhesive, a general adhesive, or a double-sided tape. According to an embodiment, the display panel 431 and the POL 432 may be integrally formed.

According to various embodiments, the display 400 may include a control circuit (not illustrated). According to an embodiment, the control circuit may include a flexible printed circuit board (FPCB) that electrically connects a main printed circuit board (e.g., the printed circuit board 340 of FIG. 3) of an electronic device (e.g., the electronic device 300 of FIG. 3) and the display panel 431, and a display driver IC (DDI) that is mounted on the FPCB. According to an embodiment, the display 400 may additionally include a touch panel 433. According to an embodiment, in the case where the display 400 is operated as an in-cell type touch display, in which a touch panel capable of recognizing a touch is included inside the display panel, or an on-cell type touch display, in which the touch panel is located outside the display panel, depending on the position at which the touch panel 433 is disposed, the control circuit may include a touch display driver IC (TDDI). In another embodiment, the display 400 may include a fingerprint sensor (not illustrated) that is disposed around the control circuit. According to an embodiment, the fingerprint sensor may include an ultrasonic fingerprint sensor, in which a fingerprint of a finger that comes into contact with or approaches the outer surface of the front cover 320 can be recognized by an ultrasonic wave that is transmitted by a separate ultrasonic sensor through holes that are formed in at least some of the constituent elements of the display 400, or an optical fingerprint sensor that can emit light through a light source (e.g., a display light source) or a separate light source inside the electronic device, obtain an image corresponding to a fingerprint through the emitted light, and recognize the fingerprint on the basis of the obtained image.

According to various embodiments, the at least one subsidiary material layer 440 may include at least one polymer member 441 or 442 disposed on a rear surface of the display panel 431, at least one functional member 443 disposed on a rear surface of the at least one polymer member 441 or 442, and a conductive sheet 450 (e.g., a metal sheet or a metal plate) disposed on a rear surface of the at least one functional member 443. According to an embodiment, the at least one polymer member 441 or 442 may be a light-blocking layer 441 (e.g., a black layer including an uneven pattern) that removes air bubbles that may form between the display panel 431 and materials attached to the underside of the display panel 431 and blocks light produced from the display panel 431 or light incident from the outside, and/or a buffer layer 442 (e.g., a sponge layer) that is disposed for shock absorption. According to an embodiment, the at least one functional member 443 may include a heat dissipation sheet (e.g., a graphite sheet) for heat dissipation, an added display, a force touch FPCB, a fingerprint sensor FPCB, a communication antenna radiator, a conductive/non-conductive tape, or an open-cell sponge. According to an embodiment, the conductive sheet 450 may contribute to increasing the rigidity of the electronic device (e.g., the electronic device 300 of FIG. 3) and may be used to block ambient noise and to disperse heat emitted from peripheral heat-emitting components. According to an embodiment, the conductive sheet 450 may include Cu, Al, Mg, SUS, or CLAD (e.g., a laminated member in which SUS and Al are alternately disposed). In another embodiment, the display 400 may further include a detecting member 445 for detecting input performed using a writing member (e.g., an electronic pen) based on a type of electromagnetic induction. According to an embodiment, the detecting member 445 may include a digitizer. According to an embodiment, the detecting member 445 may be disposed between the at least one polymer member 442 and the functional member 443. In another embodiment, the detecting member 445 may be disposed between the display panel 431 and the at least one polymer member 441.

According to various embodiments, the electronic device (e.g., the electronic device of FIG. 3) may include at least one camera module (e.g., the camera module 205 of FIG. 2A) that is disposed below the display and can capture an external subject through the display. In an embodiment, the display may include openings 4331, 4321, 4411, 4421, 4451, and 4501 that are formed at a position corresponding to the camera module (e.g., the camera module 205 of FIG. 2A). According to an embodiment, transmittance of a region corresponding to the camera module (e.g., the camera module 205 of FIG. 2A) is adjusted, for instance, by changing an array structure of R, G, and B subpixels or wiring lines, and thereby no opening may be formed in the display panel 431. In another embodiment, the POL 432 or the touch panel 433 disposed above the display panel 431 may also have the opening 4321 or 4331 eliminated therefrom if a refractive index thereof is adjusted. For example, the POL 432 and/or the touch panel 433 may be made transparent at a position corresponding to the camera module (e.g., the camera module 205 of FIG. 2A), or a polarizing property thereof may be removed. According to an embodiment, the display 400 may include an organic light-emitting diode (OLED) display or a liquid crystal display (LCD).

Figure 4B:
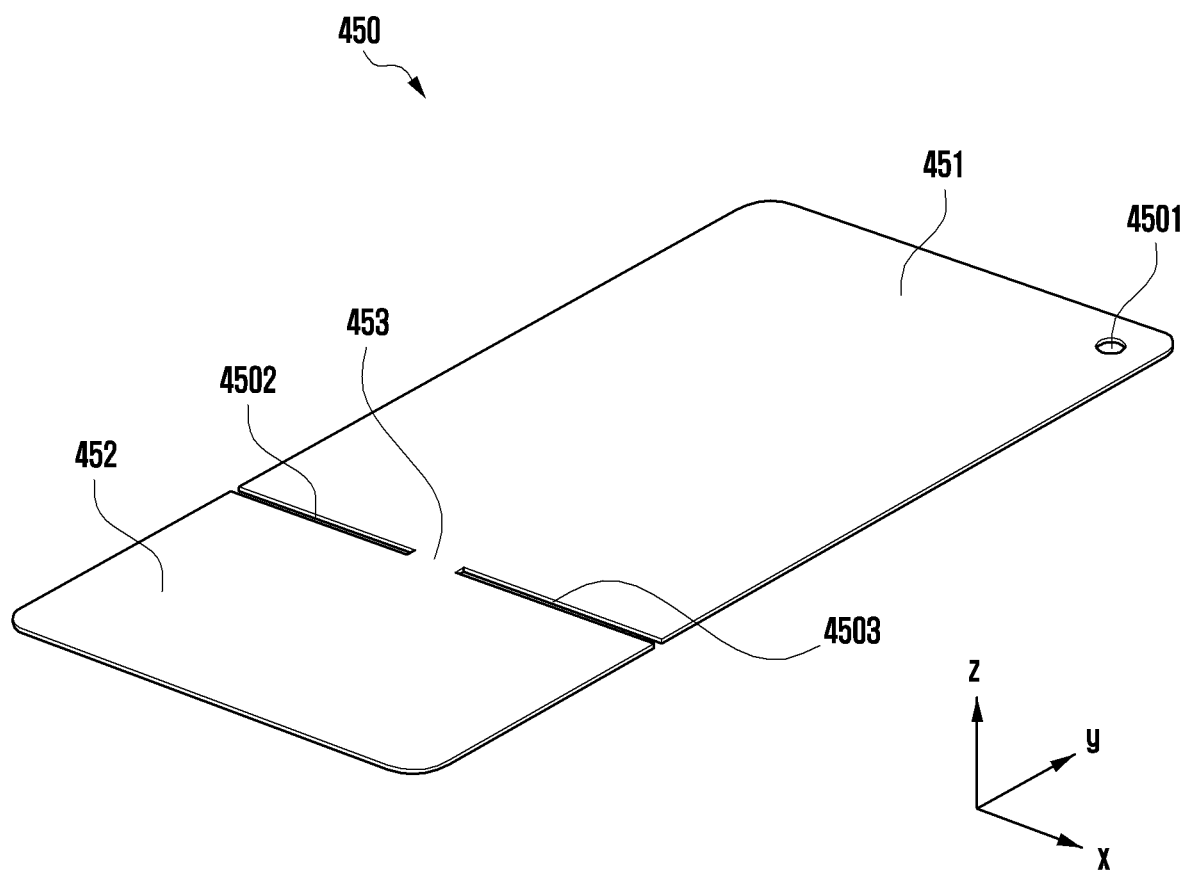
FIG. 4B is a perspective view of a conductive sheet according to various embodiments of the disclosure.

FIG. 4B is a perspective view of a conductive sheet 450 according to various embodiments of the disclosure.

According to various embodiments, a first conductive portion (e.g., a first conductive portion 5211 of FIG. 6A) of a conductive lateral member (e.g., a lateral member 520 of FIG. 6A) is connected to a wireless communication circuit (e.g., the wireless communication module 192 of FIG. 1), whereby an electronic device (e.g., the electronic device 500 of FIG. 6A) (e.g., the electronic device 200 of FIG. 2A or the electronic device 300 of FIG. 3) may be used as an antenna. According to an embodiment, the electronic device (e.g., the electronic device 500 of FIG. 6A) may include a second conductive portion (e.g., a second conductive portion 5111 of FIG. 6A) of a support member (e.g., a support member 511 of FIG. 6A) that extends from at least a part of the first conductive portion (e.g., the first conductive portion 5211 of FIG. 6A) into the internal space of the electronic device (e.g., the electronic device 500 of FIG. 6A) or is disposed adjacent to the first conductive portion (e.g., the first conductive portion 5211 of FIG. 6A). According to an embodiment, the second conductive portion (e.g., the second conductive portion 5111 of FIG. 6A) may be disposed parallel to the conductive sheet 450, and electric current induced from the first conductive portion (e.g., the first conductive portion 5211 of FIG. 6A) may produce an unnecessary parasitic resonance frequency that is active in an in-band of an antenna through the conductive sheet 450 and the second conductive portion (e.g., the second conductive portion 5111 of FIG. 6A) disposed parallel to each other. This parasitic resonance frequency shifts a working frequency band of the antenna or reduces gain, whereby the radiation characteristics of the antenna may be deteriorated.

Referring to FIG. 4B, the conductive sheet 450 may include a first slit 4502 that extends from one edge in the direction of the other edge and has a fixed width, and a second slit 4503 that extends from the other edge in the direction of the one edge and has a fixed width. According to an embodiment, the conductive sheet 450 may include a coupling 453 disposed between the first slit 4502 and the second slit 4503. According to an embodiment, the conductive sheet 450 may include a first portion 451 and a second portion 452, which are divided on the basis of the first slit 4502, the coupling 453, and the second slit 4503.

Figure 5:
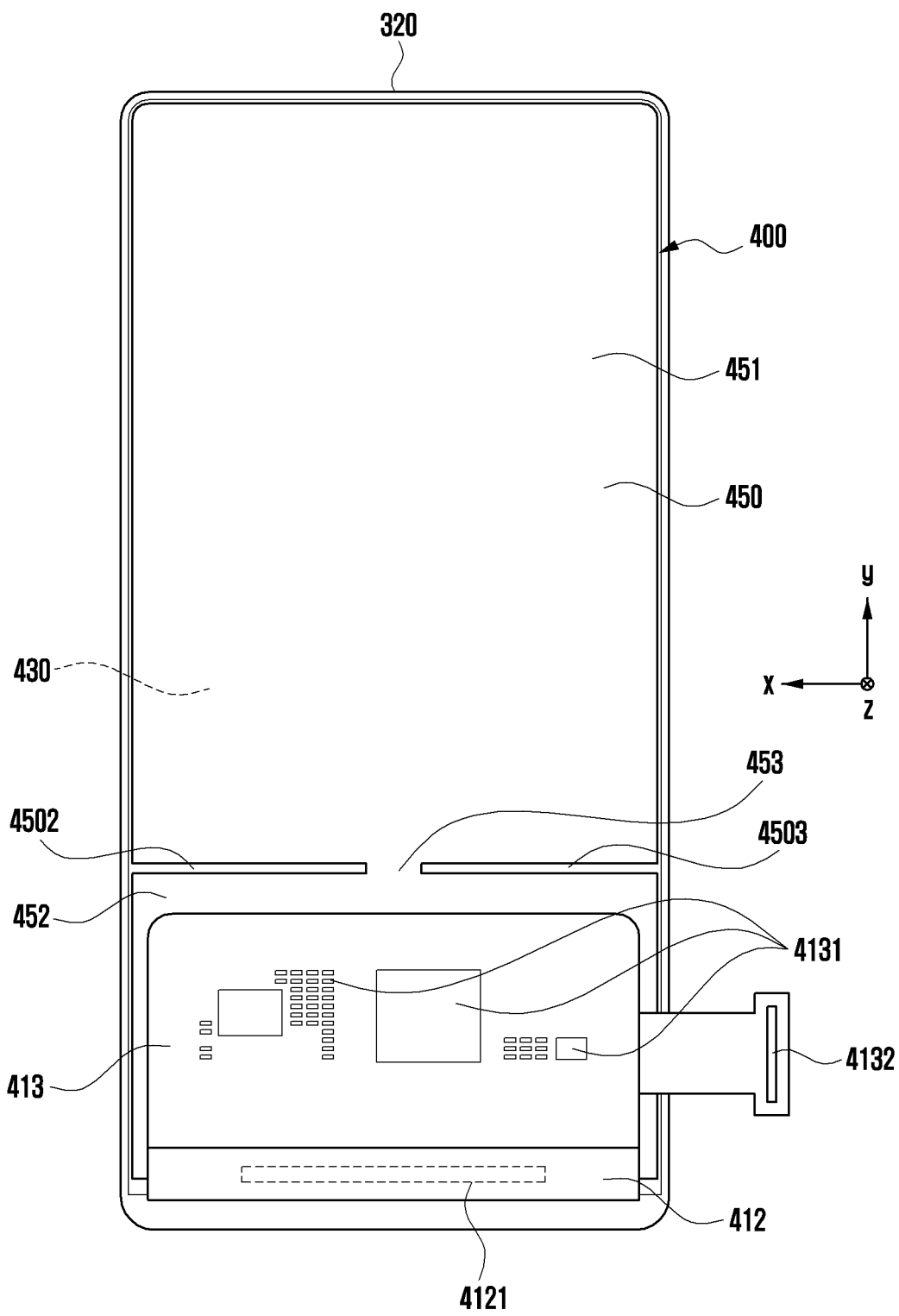
FIG. 5 is a configuration view illustrating a rear surface of a display according to various embodiments of the disclosure.

FIG. 5 is a configuration view illustrating the rear surface of a display 400 according to various embodiments of the disclosure.

A display 400 of FIG. 5 may be similar to the display 201 of FIG. 2A in at least some aspects, or may be replaced with other embodiments of the display.

Referring to FIG. 5, the display 400 may be disposed by being attached to a front cover 320 using an adhesive member. According to an embodiment, the display 400 may include a conductive sheet 450 disposed on the rear surface of a display panel 430. In another embodiment, the conductive sheet 450 may be disposed between the display panel 430 and a subsidiary material layer (e.g., the subsidiary material layer 440 of FIG. 4A).

According to various embodiments, the display 400 may include a bendable portion 412, which is bendably formed to face the conductive sheet 450 disposed on the rear surface of the display panel 430, or a subsidiary printed circuit board 413 (e.g., a flexible printed circuit board (FPCB)), which is electrically connected to the bendable portion 412. For example, the subsidiary printed circuit board 413 may be a soft printed circuit board (a flexible printed circuit board (FPCB)) or a hard printed circuit board. According to an embodiment, the display 400 may include a control circuit 4121 mounted on the bendable portion 412. According to an embodiment, the control circuit 4121 may include a display driver IC (DDI) or a touch display driver IC (TDDI) that is mounted on the bendable portion 412. According to an embodiment, the DDI or the TDDI may be mounted on the bendable portion 412 in a chip-on-panel (COP) structure. According to an embodiment, the subsidiary printed circuit board 413 and at least a part of the bendable portion 412 may be folded toward the rear surface of the display 400, and may be attached to at least a part of the conductive sheet 450 by bonding or taping. According to an embodiment, the display 400 may include a plurality of elements 4131 that are disposed in at least a partial region of the subsidiary printed circuit board 413, and may further include an electric connector 4132 that extends from at least a part of the subsidiary printed circuit board 413 and is electrically connected to a printed circuit board (e.g., the printed circuit board 340 of FIG. 3) of an electronic device (e.g., the electronic device 300 of FIG. 3). According to an embodiment, the plurality of elements 4131 may include elements such as a touch IC, a flash memory for a display, a diode for preventing ESD, or a decap.

According to various embodiments, the subsidiary printed circuit board 413 may be disposed to face at least a partial region of the second portion 452 of the conductive sheet 450. In another embodiment, the subsidiary printed circuit board 413 may be disposed to extend to at least a partial region of the first portion 451 through the second portion 452 of the conductive sheet 450. According to an embodiment, the conductive sheet 450 may be electrically connected to a ground of a printed circuit board (e.g., the printed circuit board 340 of FIG. 3) through the subsidiary printed circuit board 413. In this case, the conductive sheet 450 may be disposed so as to be physically and electrically in contact with a ground of the subsidiary printed circuit board 413, a portion of which is exposed.

Figure 6A:
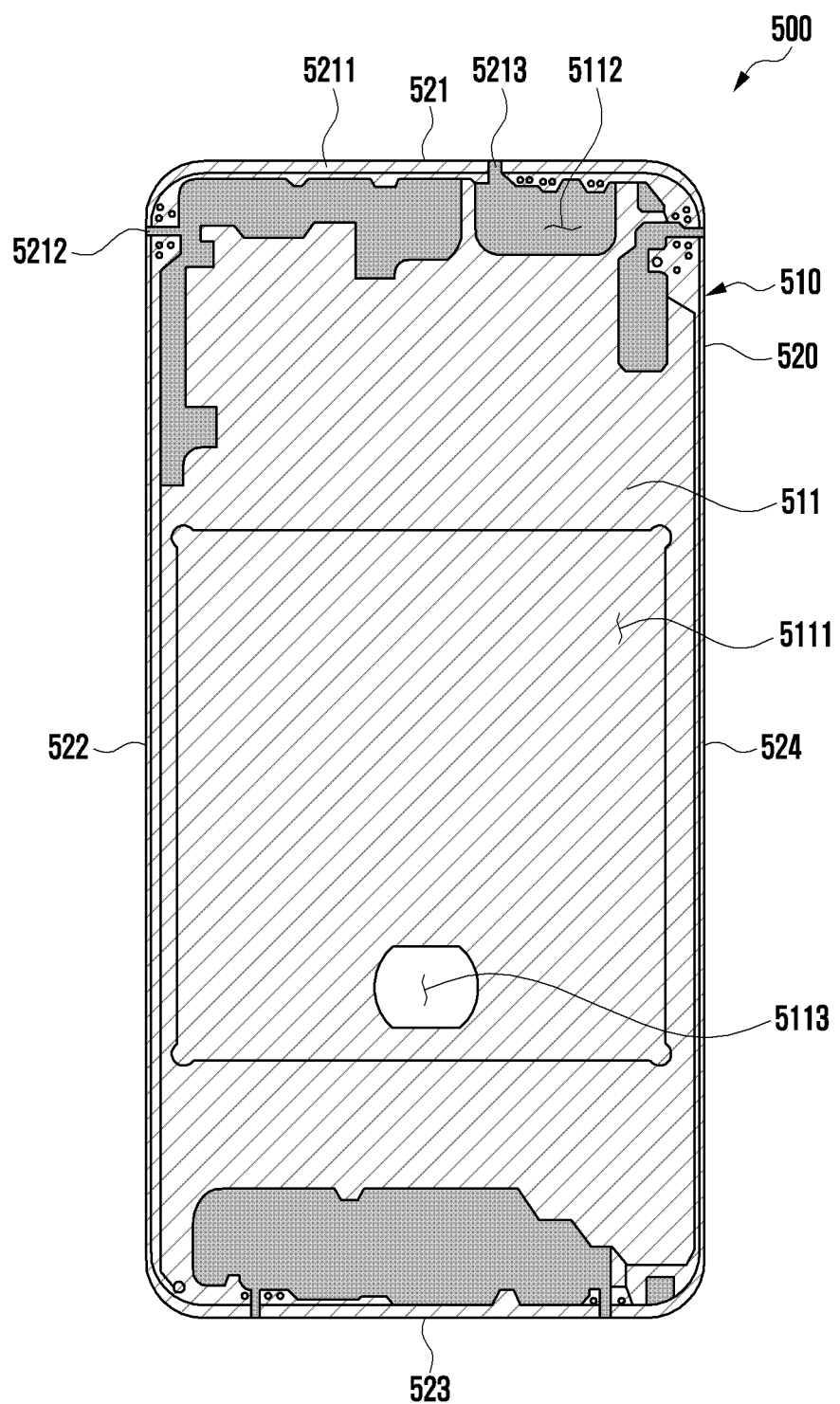
FIG. 6A is a view illustrating the configuration of a housing from which a display is omitted in an electronic device according to various embodiments of the disclosure.
Figure 6B:
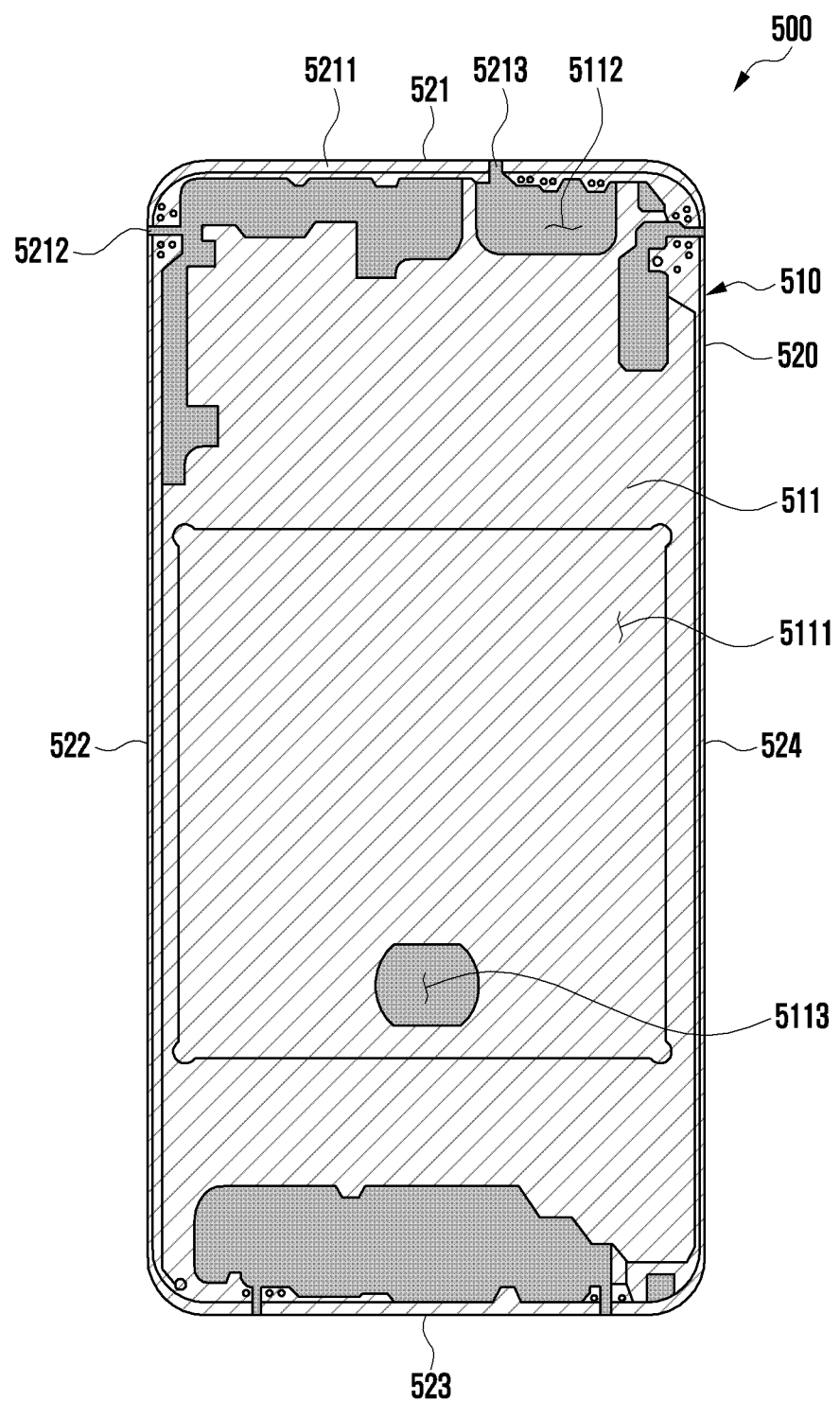
FIG. 6B is a view illustrating the configuration of a housing from which a display is omitted in an electronic device according to various embodiments of the disclosure.

FIG. 6A is a view illustrating a housing 510 from which a display 400 is omitted in an electronic device 500 according to various embodiments of the disclosure, and FIG. 6B is a view illustrating the configuration of a housing 510 from which a display 400 is omitted in an electronic device 500 according to various embodiments of the disclosure.

A housing 510 of FIG. 6A may be similar to the housing 210 of FIG. 2A in at least some aspects, or may be replaced with other embodiments of the housing.

Referring to FIG. 6A, an electronic device 500 may include a housing 510 that includes a front cover (e.g., the front plate 320 of FIG. 3), a rear cover (e.g., the rear plate 380 of FIG. 3) that is located on the opposite side of the front cover, and a lateral member 520 (e.g., the lateral member 310 of FIG. 3) that surrounds an internal space between the front cover and the rear cover. According to an embodiment, the lateral member 520 may include a conductive member (e.g., a metal member).

According to various embodiments, the lateral member 520 may include a first lateral surface 521 that has a first length, a second lateral surface 522 that extends from the first lateral surface 521 in a direction perpendicular to the first lateral surface 521 and has a second length longer than the first length, a third lateral surface 523 that extends from the second lateral surface 522 in a direction parallel to the first lateral surface 521 and has the first length, and a fourth lateral surface 524 that extends from the third lateral surface 523 in a direction parallel to the second lateral surface 522 and has the second length. According to an embodiment, the lateral member 520 may include a first conductive portion 5211 that is disposed to electrically connect the first lateral surface 521 and the second lateral surface 522 through at least one segment 5212 or 5213. According to an embodiment, the first conductive portion 5211 may be electrically connected to a wireless communication circuit (e.g., the wireless communication module 192 of FIG. 1) of the electronic device 500. According to an embodiment, the wireless communication circuit (e.g., the wireless communication module 192 of FIG. 1) may be set to transmit and/or receive a wireless signal in a first frequency band (e.g., a legacy band) through the first conductive portion 5211. In another embodiment, the electronic device 500 may include at least another conductive portion that is disposed through at least one of the other lateral surfaces and at least one additional segment. In an embodiment, the conductive portions may be set to operate in different frequency bands.

According to various embodiments, the electronic device 500 may include a support member 511 (e.g., the first support member 311 of FIG. 3) that is located in the internal space of the electronic device 500. According to an embodiment, the support member 511 may be disposed through structural coupling with the lateral member 520. According to another embodiment, the support member 511 may be formed integrally with the lateral member 520. According to an embodiment, the support member 511 may be disposed in the internal space of the electronic device 500 so as to be spaced apart from the lateral member 520 at a fixed interval. According to an embodiment, the support member 511 may include a second conductive portion 5111 (e.g., a metal member), and a non-conductive portion 5112 (e.g., a polymer member) injected into the second conductive portion 5111. According to an embodiment, the segments 5212 and 5213 may be formed through extension of the non-conductive portion.

According to various embodiments, the support member 520 may include an opening 5113 disposed in the second conductive portion 5111. According to an embodiment, when a front cover (e.g., the front plate 320 of FIG. 3) is viewed from above, the opening 5113 may be disposed at a position overlapping a coupling (e.g., the coupling 453 of FIG. 4B) of the conductive sheet 450. According to an embodiment, the opening 5113 may include a jig hole that should be formed in the support member 511 or a hole that is intentionally formed in the support member 511. According to an embodiment, the opening 5113 is disposed to overlap the coupling (e.g., the coupling 453 of FIG. 4B) of the conductive sheet (e.g., the conductive sheet 450 of FIG. 4B). Thereby, without the coupling (e.g., the coupling 453 of FIG. 4B) that couples slits (e.g., the slits 4502 and 4503 of FIG. 4B), the first portion (e.g., the first portion 451 of FIG. 4B) and the second portion (e.g., the second portion 452 of FIG. 4B) of the conductive sheet (e.g., the conductive sheet 450 of FIG. 4B) are electrically disconnected, whereby they help shift a parasitic resonance frequency to an out-band.

Referring to FIG. 6B, the opening 5113 according to an embodiment may be filled with a non-conductive portion such as a polymer member.

Figure 7A:
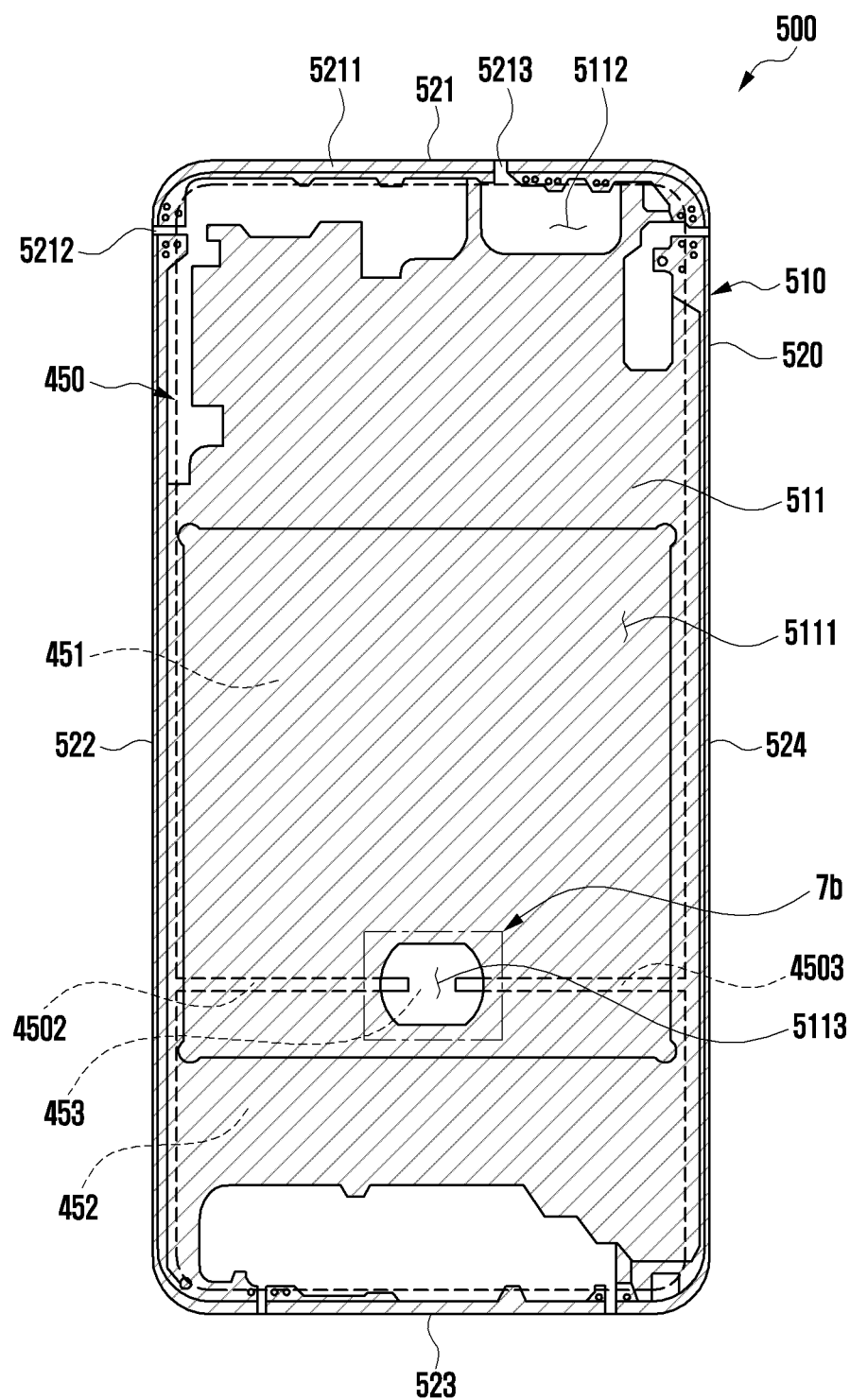
FIG. 7A is a view illustrating a structure in which a conductive sheet is disposed in a housing in an electronic device according to various embodiments of the disclosure.
Figure 7B:
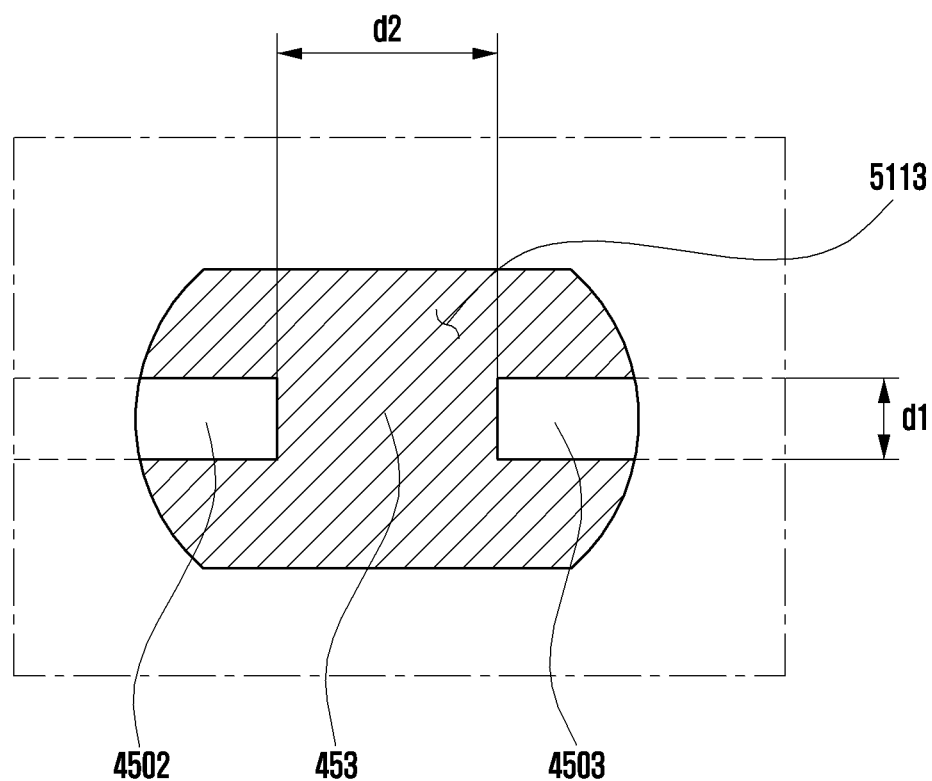
FIG. 7B is an enlarged view illustrating region 7b of FIG. 7A according to various embodiments of the disclosure.

FIG. 7A is a view illustrating a structure in which a conductive sheet 450 is disposed in a housing 510 in an electronic device 500 according to various embodiments of the disclosure. FIG. 7B is an enlarged view illustrating region 7*b* of FIG. 7A according to various embodiments of the disclosure.

Referring to FIG. 7A, an electronic device 500 may include a display (e.g., the display 400 of FIG. 4A) that is disposed to be at least partly visible from an outside through a front cover (e.g., the front plate 320 of FIG. 3) in an internal space of the electronic device 500. According to an embodiment, the display (e.g., the display 400 of FIG. 4A) may be at least partly supported by a support member 511 located in the internal space of the electronic device 500. According to an embodiment, a conductive sheet 450 disposed on the display (e.g., the display 400 of FIG. 4A) may be aligned on the support member 511 corresponding to the layout of the display (e.g., the display 400 of FIG. 4A).

According to various embodiments, in the case where the display (e.g., the display 400 of FIG. 4A) is disposed in a housing 510 of the electronic device 500, an opening 5113 may be formed at a position overlapping a coupling 453 of the conductive sheet 450 when the front cover (e.g., the front plate 320 of FIG. 3) is viewed from above. According to an embodiment, the coupling 453 may be disposed to occupy at least the space of the opening 5113. According to an embodiment, when the front cover (e.g., the front plate 320 of FIG. 3) is viewed from above, the coupling 453 may be formed to be smaller than the opening 5113 in the internal space of the opening 5113. In this case, the coupling 453 electrically connects a first portion 451 and a second portion 452 of the conductive sheet 450, whereby flickering of the display (e.g., the display 400 of FIG. 4A) can be prevented. Slits 4502 and 4503 act as one slit with no coupling 453 through the opening 5113 overlapping the coupling 453 that connects the slits 4502 and 4503, and thereby the first portion 451 and the second portion 452 can maintain an electrically disconnected state with regard to an antenna function. Therefore, a parasitic resonance frequency produced between the conductive sheet 450 and a second conductive portion 5111 of the support member 511 can be shifted to an out-band by the slits 4502 and 4503 and the opening 5113 through the first portion 451 and the second portion 452, which are electrically disconnected with regard to the antenna function.

Referring to FIG. 7B, the frequency characteristics of the parasitic resonance frequency produced between the conductive sheet 450 and the second conductive portion 5111 may be determined according to the shapes of the slits 4502 and 4503 and the coupling 453, which overlap the opening 5113 formed in the second conductive portion 5111 of the support member 511. According to an embodiment, depending on the interval d1 of the slits 4502 and 4503 overlapping the opening 5113 and the length d2 of the coupling 453 when the front cover (e.g., the front plate 320 of FIG. 3) is viewed from above, the parasitic resonance frequency may be shifted in a specific direction. For example, as the interval d1 of the slit 4502 becomes wider and the length d2 of the coupling 453 becomes shorter, the parasitic resonance frequency may be shifted to a lower frequency band.

Figure 8:
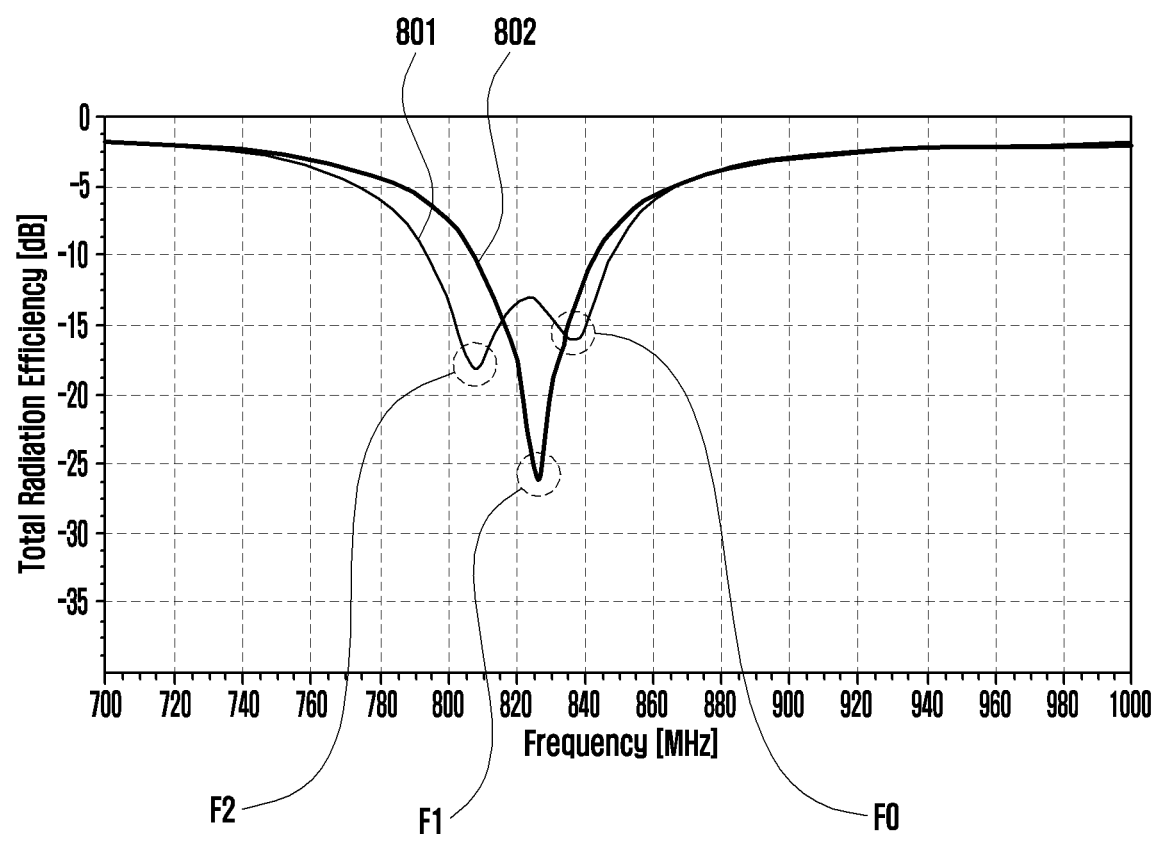
FIG. 8 is a graph illustrating the results of comparing reflection coefficients of an antenna depending on whether or not a coupling and an opening overlap each other according to various embodiments of the disclosure.

FIG. 8 is a graph illustrating the results of comparing reflection coefficients of an antenna depending on whether or not a coupling 453 and an opening 5113 overlap each other according to various embodiments of the disclosure.

Referring to FIG. 8, it can be found, in the case where a conductive sheet 450 having only a coupling 453 is disposed in an antenna using a first conductive portion 5211 operated in a first frequency band (e.g., a band of about 830 MHz), a parasitic resonance frequency F2 is produced as illustrated, and the operating frequency F0 is shifted to an undesired band (graph 801). According to the embodiment, it can be seen that, in the case where an opening 5113 formed in a second conductive portion 5111 of a support member 511 is disposed to overlap the coupling 453 of the conductive sheet 450, the antenna is smoothly operated in the first frequency band F1 (e.g., the band of about 830 MHz), and the parasitic resonance frequency falls outside of the operating frequency band (graph 802).

Figure 9A:
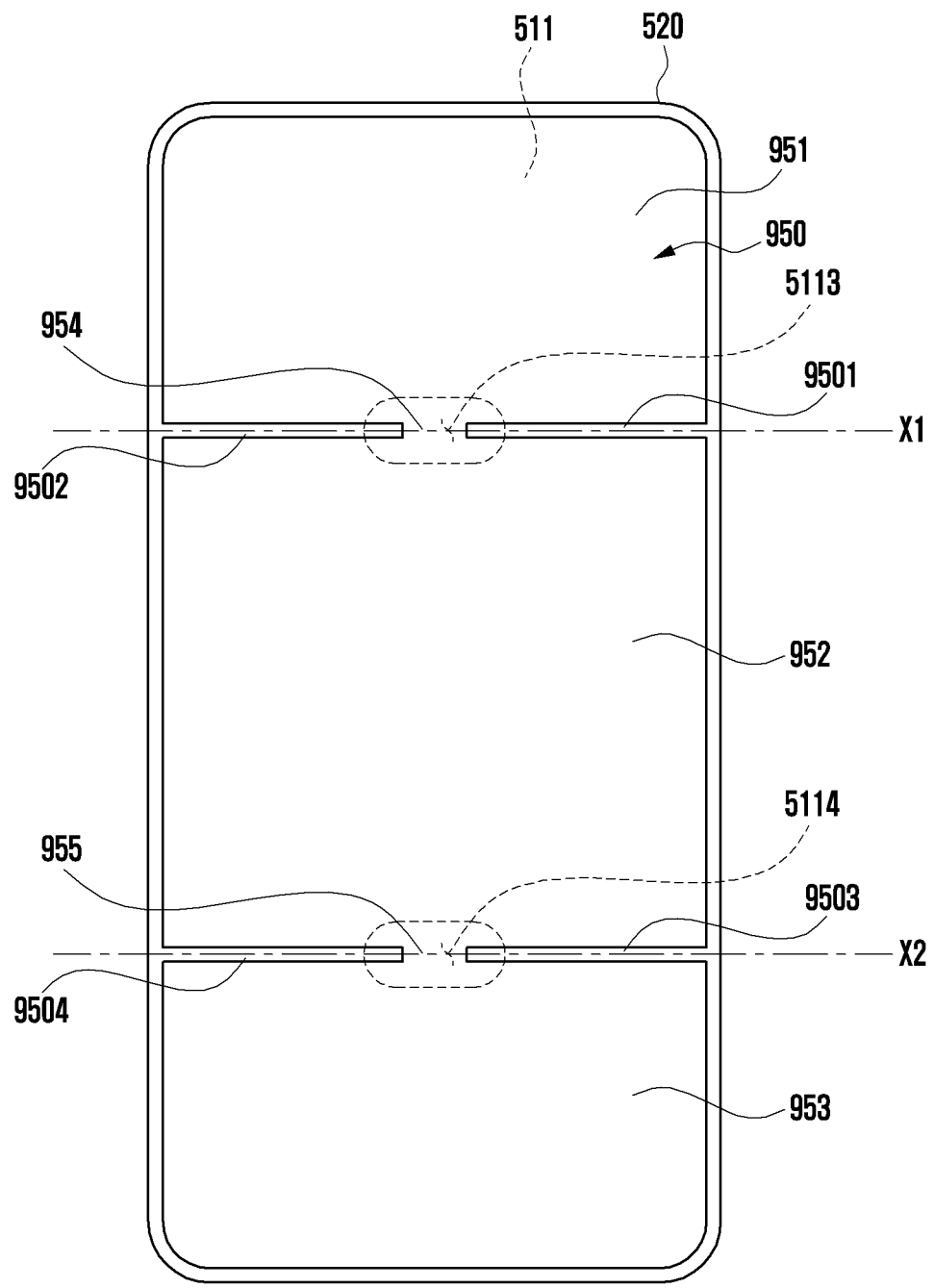
FIG. 9A is a view illustrating the configuration of a conductive sheet according to various embodiments of the disclosure.
Figure 9B:
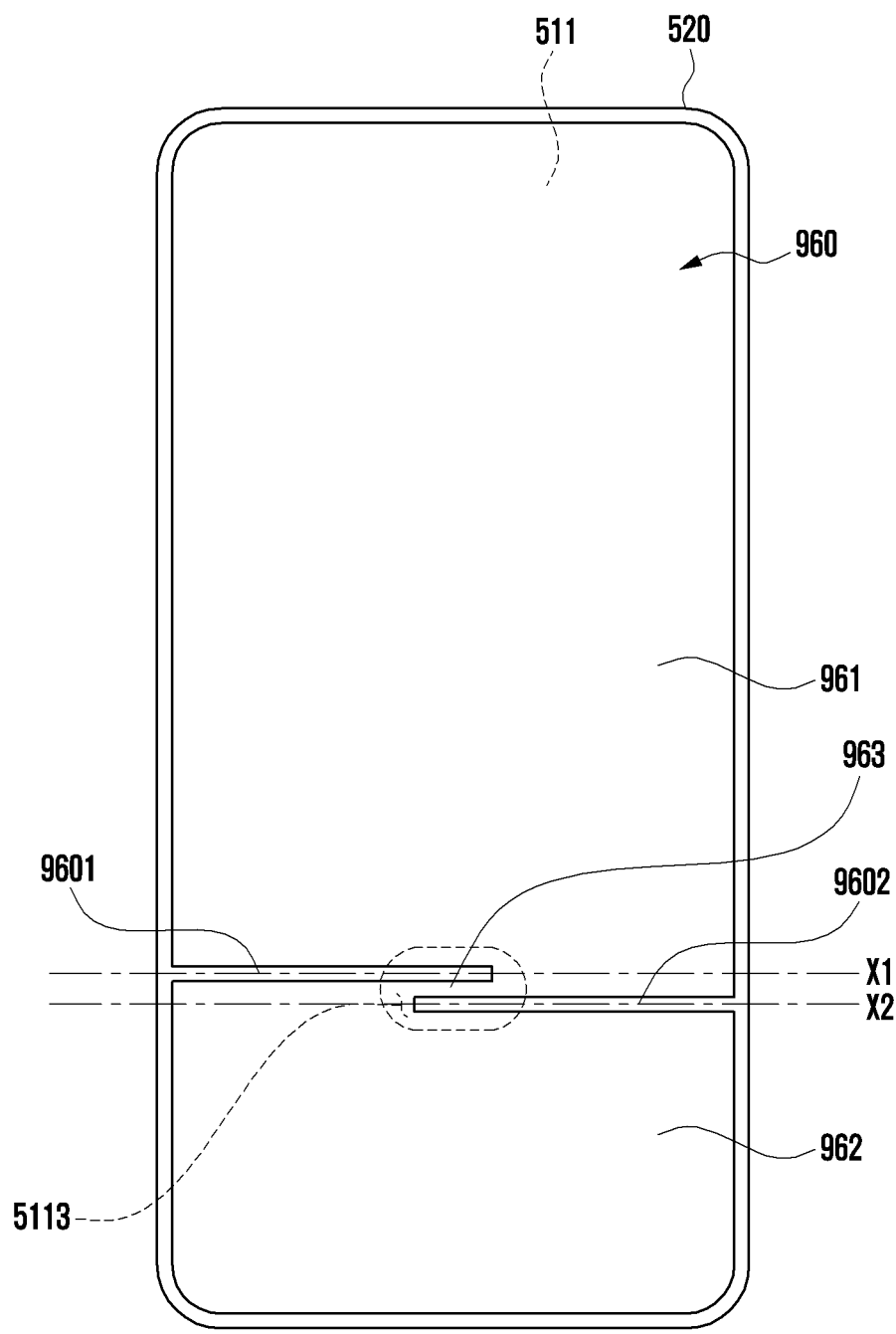
FIG. 9B is a view illustrating the configuration of a conductive sheet according to various embodiments of the disclosure.

FIG. 9A is a view illustrating the configuration of a conductive sheet 950 according to various embodiments of the disclosure, and FIG. 9B is a view illustrating the configuration of a conductive sheet 960 according to various embodiments of the disclosure.

A conductive sheet 950 of FIG. 9A and a conductive sheet 960 of FIG. 9B may be similar to the conductive sheet 450 of FIG. 4A in at least some aspects, but other embodiments of the conductive sheet may be included in the scope of the disclosure. Referring to FIG. 9A, the conductive sheet 950 may include a first slit 9501 that extends from one edge in the direction of the other edge along a first axis X1, and a second slit 9502 that extends from the other edge in the direction of the one edge. According to an embodiment, the conductive sheet 950 may include a first coupling 954 disposed between the first slit 9501 and the second slit 9502. According to an embodiment, the conductive sheet 950 may include a third slit 9503 that extends from one edge in the direction of the other edge along a second axis X2, different from the first axis X1, and a fourth slit 9504 that extends from the other edge in the direction of the one edge. According to an embodiment, the conductive sheet may include a second coupling 955 disposed between the third slit 9503 and the fourth slit 9504. According to an embodiment, the conductive sheet 950 may be divided into a first portion 951, a second portion 952, and a third portion 953 on the basis of the first axis X1, which includes the first slit 9501, the first coupling 954, and the second slit 9502, and the second axis X2, which includes the third slit 9503, the second coupling 955, and the fourth slit 9504. According to an embodiment, the first portion 951 and the second portion 952 may be connected through the first coupling 954. According to an embodiment, the second portion 952 and the third portion 953 may be connected through the second coupling 955. According to an embodiment, the first coupling 954 is disposed to overlap a first opening 5113 formed in a support member 511 (e.g., a second conductive portion) (e.g., the second conductive portion 5111 of FIG. 6A) of the support member, whereby the first portion 951 and the second portion 952 may serve to be electrically connected through the first coupling 954 with regard to a ground of the electronic device, and may serve to be electrically disconnected through the first opening 5113 with regard to an antenna function. According to an embodiment, the second coupling 955 is disposed to overlap a second opening 5114 formed in the support member 511 (e.g., the second conductive portion) (e.g., the second conductive portion 5111 of FIG. 6A) of the support member, whereby the second portion 952 and the third portion 953 may serve to be electrically connected through the second coupling 955 with regard to a ground of the electronic device, and may serve to be electrically disconnected through the second opening 5114 with regard to an antenna function.

According to various embodiments, in order to shift a parasitic resonance frequency formed between the conductive sheet 950 and the support member 511 to an out-band of the operating frequency band of the antenna in the electronic device, the conductive sheet 950 may be divided into four or more portions through a plurality of slits and a plurality of openings.

Referring to FIG. 9B, the conductive sheet 960 may include a first slit 9601, which is formed along a first axis X1, and a second slit 9602, which is formed along a second axis X2 different from the first axis X1. According to an embodiment, one end of the first slit 9601 and one end of the second slit 9602 may be disposed to cross each other. For example, the distance from one edge to the other edge of the conductive sheet 960 may be smaller than the sum of the length of the first slit 9601 and the length of the second slit 9602. According to an embodiment, edges of the first slit 9601 and the second slit 9602 may be disposed to cross each other, and the region of the conductive sheet 960 that faces the edges may be formed as a coupling 963. According to an embodiment, the conductive sheet 960 may be divided into a first portion 961 and a second portion 962 by the first slit 9601, the coupling 963, and the second slit 9602. According to an embodiment, the edge of the first slit 9601, the coupling 954, and the edge of the second slit 9602 are disposed to overlap the opening 5113 formed in a second conductive portion (e.g., the second conductive portion 5111 of FIG. 6A) of the support member 511 (e.g., the support member) of a lateral member 520, and thereby the first portion 961 and the second portion 962 may be electrically connected through the coupling 963 with regard to the ground of the electronic device, and may be electrically disconnected through the opening 5113 with regard to the antenna function.

Figure 10:
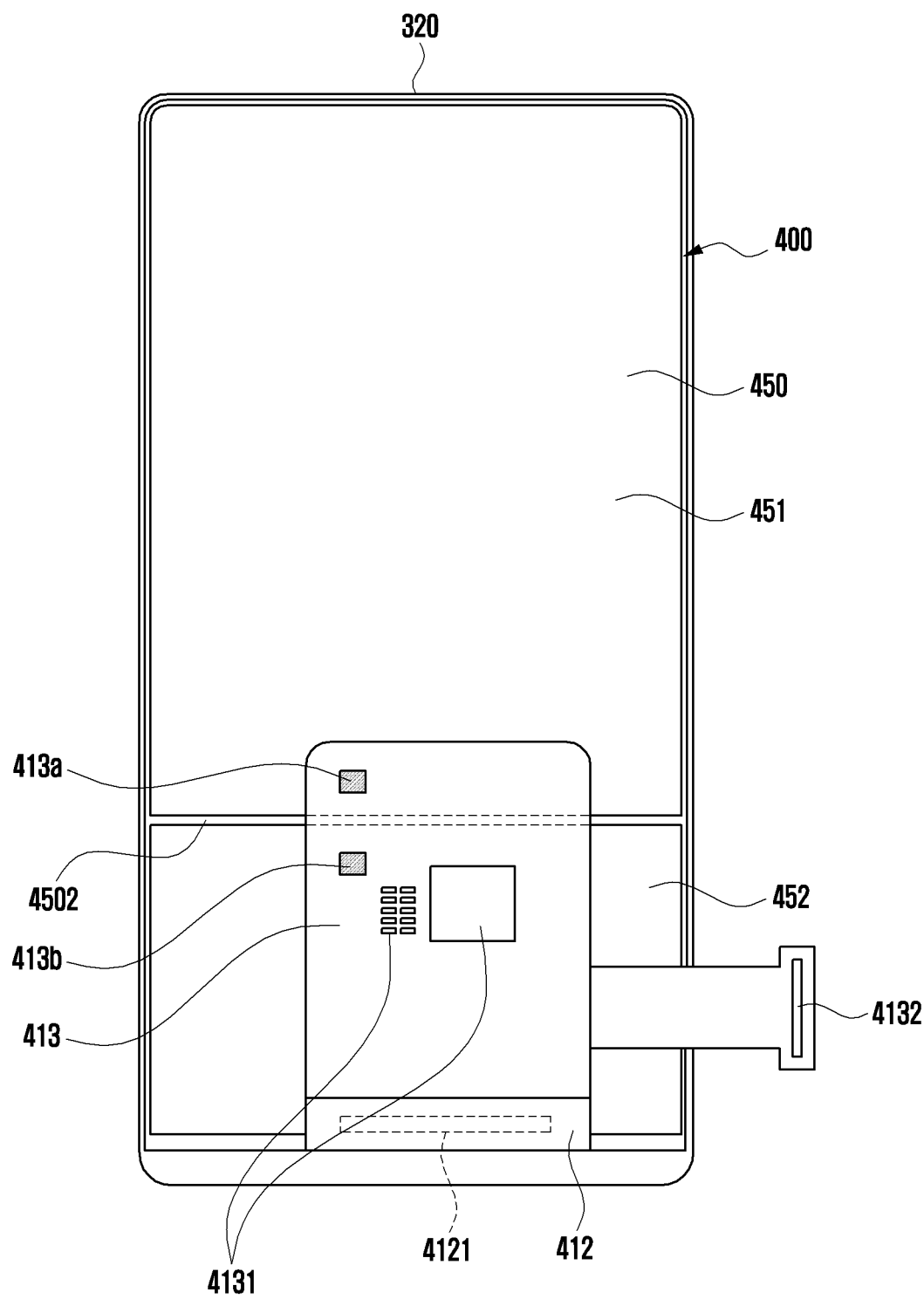
FIG. 10 is a view illustrating the configuration of a display according to various embodiments of the disclosure.
Figure 11:
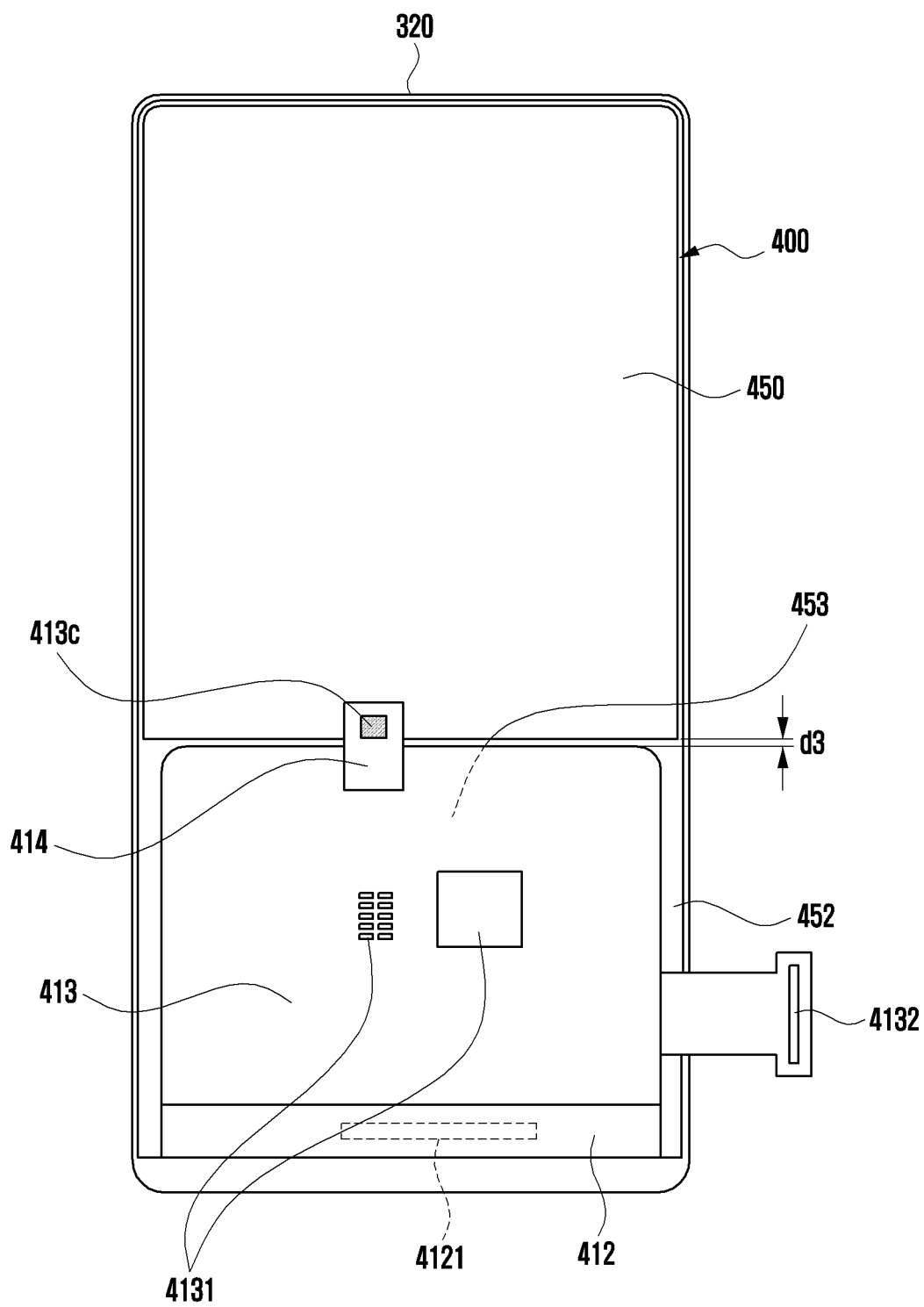
FIG. 11 is a view illustrating the configuration of a display according to various embodiments of the disclosure.

FIG. 10 is a view illustrating the configuration of a display 400 according to various embodiments of the disclosure, and FIG. 11 is a view illustrating the configuration of a display 400 according to various embodiments of the disclosure.

A display 400 of FIG. 10 may be similar to the display 400 of FIG. 3 in at least some aspects, or may be replaced with another embodiment of the display.

Referring to FIG. 10, the display 400 may be disposed on the rear surface of a front cover 320. The display 400 may include a bendable portion 412 that extends outwards from a display panel (e.g., the display panel 431 of FIG. 4A) and includes a control circuit 4121, and a subsidiary printed circuit board 413 that is connected to the bendable portion 412 and includes a plurality of electric elements 4131. According to an embodiment, the subsidiary printed circuit board 413 and a part of the bendable portion 412 may be disposed so as to be folded so as to face at least a part of a conductive sheet 450.

According to various embodiments, the conductive sheet 450 may be divided into a first portion 451 and a second portion 452 by a slit 4502 that extends from one edge to the other edge. According to an embodiment, the first and second portions 451 and 452 resulting from division of the conductive sheet 450 may be electrically connected to a ground of the electronic device in order to prevent a malfunction of the display 400, such as flickering thereof. According to an embodiment, the subsidiary printed circuit board 413 may be disposed to have a size that extends to at least a part of the first portion 451 through the second portion 452. In this case, the first portion 451 of the conductive sheet 450 may be electrically connected to a ground of the subsidiary printed circuit board 413 through a first connecting member 413a in a region overlapping the subsidiary printed circuit board 413. According to an embodiment, the second portion 452 of the conductive sheet 450 may be electrically connected to a ground of the subsidiary printed circuit board 413 through a second connecting member 413b in the region overlapping the subsidiary printed circuit board 413. According to an embodiment, the first connecting member 413a and/or the second connecting member 413b may include a conductive tape or a conductive bond that electrically connects an exposed ground of the subsidiary printed circuit board 413 and the first portion 451 and the second portion 452 of the conductive sheet 450. Therefore, the first portion 451 and the second portion 452 may be connected to the ground of the subsidiary printed circuit board 413 through the first connecting member 413a and the second connecting member 413b, and the ground of the subsidiary printed circuit board 413 may be connected to a printed circuit board (e.g., the printed circuit board 340 of FIG. 3) of the electronic device through an electric connector 4132. In another embodiment, the second portion 452 may be directly electrically connected to a ground of the printed circuit board (e.g., the printed circuit board 340 of FIG. 3) through an electric connecting member. In another embodiment, the first portion 451 may be directly connected to the ground of the printed circuit board (e.g., the printed circuit board 340 of FIG. 3) through a separate electric connecting member.

Referring to FIG. 11, the conductive sheet 450 may be disposed on a rear surface of the display 400 so as to be parallel to a subsidiary printed circuit board 413 (e.g., a flexible printed circuit board (FPCB)) and spaced apart at a fixed interval d3 therefrom, without overlapping the same. According to an embodiment, a ground included in the subsidiary printed circuit board 413 may be disposed to have substantially the same size of the second portion 452 of FIG. 10. According to an embodiment, the subsidiary printed circuit board 413 may be formed as a soft printed circuit board, a hard printed circuit board, or a hard/soft printed circuit board. For example, like the second portion 452 of FIG. 10, the ground of the subsidiary printed circuit board 413 may serve as the second portion 452 of the conductive sheet 450. Therefore, a separation interval between the ground of the subsidiary printed circuit board 413 and the conductive sheet 450 may be substantially the same as a width of the slit 4502 of FIG. 10. In this case, the conductive sheet 450 may be electrically connected to the ground of the subsidiary printed circuit board 413 through a separate electric connecting member 414 connected to the subsidiary printed circuit board 413 and a connecting member 413c. In another embodiment, the electric connecting member 414 may be replaced by a portion of the subsidiary printed circuit board 413 that integrally extends from at least a part of the subsidiary printed circuit board 413 to a position overlapping at least a part of the conductive sheet 450. According to an embodiment, the electric connecting member 414 may include another FPCB or a conductive cable. The ground included in the subsidiary printed circuit board 413 may be electrically connected to the ground included in the electronic device. In another embodiment, the conductive sheet 450 may be directly connected to the ground of the printed circuit board (e.g., the printed circuit board 340 of FIG. 3) through a separate electric connecting member.

According to various embodiments of the disclosure, the electronic device removes the parasitic resonance frequency produced between the conductive sheet and the conductive support member without causing a malfunction resulting from damage, heat dissipation, flickering, or leakage current of the display, and thereby can help to improve the radiation performance of the antenna.

According to various embodiments, an electronic device (e.g., the electronic device 200 of FIG. 2A) includes: a housing (e.g., the housing 210 of FIG. 2A) that includes a front cover (e.g., the front plate 202 of FIG. 2A), a rear cover (e.g., the rear plate 211 of FIG. 2B) located on the opposite side of the front cover, and a lateral member (e.g., the lateral member 218 of FIG. 2A) surrounding the space between the front cover and the rear cover, the lateral member having a first conductive portion (e.g., the first conductive portion 5211 of FIG. 7A) formed on at least a portion thereof; a support member (e.g., the support member 511 of FIG. 7A) that is disposed in the space of the housing and includes a second conductive portion (e.g., the second conductive portion 5111 of FIG. 7A) having therein at least one opening (e.g., the opening 5113 of FIG. 7A); a display (e.g., the display 400 of FIG. 4A) configured to include a conductive sheet (e.g., the conductive sheet 450 of FIG. 4A) that is disposed between the front cover and the support member so as to be visible from an outside through at least a part of the front cover and is disposed to face the support member; and a wireless communication circuit (e.g., the wireless communication module 192 of FIG. 1) that is electrically connected to the first conductive portion, wherein the conductive sheet may include a first portion (e.g., the first portion 451 of FIG. 7A), a second portion (e.g., the second portion 452 of FIG. 7A) disposed adjacent to the first portion, and a coupling (e.g., the coupling 453 of FIG. 7A) that is partly connected between the first portion and the second portion, and the coupling may be disposed at a position overlapping the opening when the front cover is viewed from above.

According to various embodiments, the first conductive portion may be formed to be electrically disconnected through at least one non-conductive segment (e.g., the segments 5212 and 5213 of FIG. 7A) disposed at at least a part of the lateral member.

According to various embodiments, the wireless communication circuit may be set to transmit and/or receive a wireless signal of a first frequency band through the first conductive portion.

According to various embodiments, the first frequency band may include a range from 800 MHz to 3000 MHz.

According to various embodiments, a resonance frequency formed between the conductive sheet and the second conductive portion may be active in a band different from the first frequency band.

According to various embodiments, when the front cover is viewed from above, the opening may be formed to have a larger area than the coupling.

According to various embodiments, the opening may include at least one jig hole formed in the second conductive portion.

According to various embodiments, the first portion and the second portion may be disposed so as to be spaced apart from each other by a slit (e.g., the slit 4502 of FIG. 7A), and the coupling may connect the first portion and the second portion across the slit.

According to various embodiments, when the front cover is viewed from above, at least a part of the slit may be disposed to overlap the opening.

According to various embodiments, the characteristics of the resonance frequency formed between the conductive sheet and the second conductive portion may be determined by an area of the coupling out of the opening when the front cover is viewed from above.

According to various embodiments, the display may include a display panel (e.g., the display panel 431 of FIG. 5) and an FPCB (e.g., the subsidiary printed circuit board 413 of FIG. 5) that is folded from the display panel to the rear surface of the display and is disposed to at least partly overlap the first portion.

According to various embodiments, the electronic device may further include a printed circuit board (e.g., the printed circuit board 340 of FIG. 3) that is disposed in the space and includes a ground that is electrically connected to the FPCB, and the FPCB may be electrically connected to the first portion through at least a portion thereof.

According to various embodiments, the first portion may be electrically connected to the ground of the printed circuit board through the FPCB.

According to various embodiments, the second portion may be electrically connected to the FPCB through an electric connecting member, and may thereby be electrically connected to the ground of the printed circuit board.

According to various embodiments, the electric connecting member may branch off from the FPCB, or may be separately connected to the FPCB.

According to various embodiments, the support member may further include a non-conductive portion (e.g., the non-conductive portion 5112 of FIG. 7A) coupled with the second conductive portion.

According to various embodiments, an electronic device (e.g., the electronic device 200 of FIG. 2A) includes: a housing (e.g., the housing 210 of FIG. 2A) that includes a front cover (e.g., the front plate 202 of FIG. 2A), a rear cover (e.g., the rear plate 211 of FIG. 2B) located on the opposite side of the front cover, and a lateral member (e.g., the lateral member 218 of FIG. 2A) surrounding the space between the front cover and the rear cover, the lateral member having a first conductive portion (e.g., the first conductive portion 5211 of FIG. 7A) formed on at least a portion thereof; a support member (e.g., the support member 511 of FIG. 7A) that is disposed in the space of the housing and includes a second conductive portion (e.g., the second conductive portion 5111 of FIG. 7A) having therein at least one opening (e.g., the opening 5113 of FIG. 7A); a display (e.g., the display 400 of FIG. 10) that is disposed between the front cover and the support member so as to be visible from an outside through at least a part of the front cover and includes a display panel (e.g., the display panel 431 of FIG. 5), a conductive sheet (e.g., the conductive sheet 450 of FIG. 10) that is disposed on a rear surface of the display panel and is disposed to be divided into a first portion (e.g., the first portion 451 of FIG. 10) and a second portion (e.g., the second portion 452 of FIG. 10) through a slit (e.g., the slit 4502 of FIG. 10), and an FPCB (e.g., the subsidiary printed circuit board 413 of FIG. 10) that extends from the display panel and is disposed so as to be folded to face at least a part of the conductive sheet; and a wireless communication circuit (e.g., the wireless communication module 192 of FIG. 1) that is electrically connected to the first conductive portion, wherein the FPCB may be disposed to overlap at least partial regions of the first portion and the second portion when the front cover is viewed from above, and the first portion and the second portion may be electrically connected to a ground of the FPCB through the regions disposed to overlap each other.

According to various embodiments, the wireless communication circuit may be set to transmit and/or receive a wireless signal of a first frequency band through the first conductive portion.

According to various embodiments, a resonance frequency formed between the conductive sheet and the second conductive portion may be operated in a band different from the first frequency band.

According to various embodiments, an electronic device (e.g., the electronic device 200 of FIG. 2A) includes: a housing (e.g., the housing 210 of FIG. 2A) that includes a front cover (e.g., the front plate 202 of FIG. 2A), a rear cover (e.g., the rear plate 211 of FIG. 2B) located on the opposite side of the front cover, and a lateral member (e.g., the lateral member 218 of FIG. 2A) surrounding the space between the front cover and the rear cover, the lateral member having a first conductive portion (e.g., the first conductive portion 5211 of FIG. 7A) formed on at least a portion thereof; a support member (e.g., the support member 511 of FIG. 7A) that is disposed in the space of the housing and includes a second conductive portion (e.g., the second conductive portion 5111 of FIG. 7A) having therein at least one opening (e.g., the opening 5113 of FIG. 7A); a display (e.g., the display 400 of FIG. 11) that is disposed between the front cover and the support member so as to be visible from an outside through at least a part of the front cover and includes a display panel (e.g., the display panel 431 of FIG. 5), a conductive sheet (e.g., the conductive sheet 450 of FIG. 11) that is disposed on a rear surface of the display panel, and an FPCB (e.g., the subsidiary printed circuit board 413 of FIG. 11) that extends from the display panel, is disposed so as to be folded to face a rear surface of the display, and includes a ground layer having substantially the same size as a remaining region of the display panel excluding the conductive sheet; and a wireless communication circuit (e.g., the wireless communication module of FIG. 1) that is electrically connected to the first conductive portion, wherein the FPCB may be disposed side by side to be adjacent to the conductive sheet when the front cover is viewed from above, and may be electrically connected to the conductive sheet through an electric connecting member (e.g., the electric connecting member 414 of FIG. 11) that extends from the FPCB.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing comprising:
        a front cover facing a first direction,
        a rear cover facing a second direction opposite to the first direction, and
        a lateral member surrounding a space between the front cover and the rear cover, the lateral member having a first conductive portion formed on at least a portion thereof;
    a support member disposed in the space of the housing and including a second conductive portion having therein at least one opening;
    a display disposed between the front cover and the support member to be visible from an outside of the electronic device through at least a part of the front cover and comprising:
        a display panel, and
        a conductive sheet disposed on a rear surface of the display panel; and
    a wireless communication circuit electrically connected to the first conductive portion,
    wherein the conductive sheet comprises:
        a first portion,
        a second portion disposed adjacent to the first portion, and
        a connecting portion that is partly connected between the first portion and the second portion,
    wherein the connecting portion is disposed at a position overlapping the opening as the front cover is viewed from above, and
    wherein the conductive sheet is disposed to have substantially a same size as the display panel.

2. The electronic device of claim 1, wherein the first conductive portion is formed to be electrically disconnected by at least one non-conductive segment disposed at at least a part of the lateral member.

3. The electronic device of claim 1, wherein the wireless communication circuit is configured to transmit and/or receive a wireless signal of a first frequency band through the first conductive portion.

4. The electronic device of claim 3, wherein the first frequency band comprises a range from 800 MHz to 3000 MHz.

5. The electronic device of claim 3, wherein a resonance frequency formed between the conductive sheet and the second conductive portion is active in a band different from the first frequency band.

6. The electronic device of claim 1, wherein, as the front cover is viewed from above, the opening is formed to have a larger area than the connecting portion.

7. The electronic device of claim 1, wherein the opening comprises at least one jig hole formed in the second conductive portion.

8. The electronic device of claim 1,
    wherein the first portion and the second portion are disposed apart from each other through a slit, and
    wherein the connecting portion connects the first portion and the second portion across the slit.

9. The electronic device of claim 8, wherein, as the front cover is viewed from above, at least a part of the slit is disposed to overlap the opening.

10. The electronic device of claim 1, wherein characteristics of a resonance frequency formed between the conductive sheet and the second conductive portion are determined by an area of the coupling connecting portion that is located within the opening as the front cover is viewed from above.

11. The electronic device of claim 1, wherein the display comprises a flexible printed circuit board (FPCB) that is folded from the display panel to a rear surface of the conductive sheet and is disposed to at least partly overlap the first portion.

12. The electronic device of claim 11, further comprising:
    a printed circuit board disposed in the space and comprising a ground electrically connected to the FPCB,
    wherein the FPCB is electrically connected to the first portion through at least a portion thereof.

13. The electronic device of claim 12, wherein the first portion is electrically connected to the ground of the printed circuit board through the FPCB.

14. The electronic device of claim 12, wherein the second portion is electrically connected to the FPCB through an electric connecting member, and is thereby electrically connected to the ground of the printed circuit board.

15. The electronic device of claim 14, wherein the electric connecting member branches off from the FPCB or is separately connected to the FPCB.

16. The electronic device of claim 1, wherein the support member further comprises a non-conductive portion coupled with the second conductive portion.

17. An electronic device comprising:
a housing comprising:
a front cover,
a rear cover located on an opposite side of the front cover, and
a lateral member surrounding a space between the front cover and the rear cover, the lateral member having a first conductive portion formed on at least a portion thereof;
a support member disposed in the space of the housing and comprising a second conductive portion having therein at least one opening;
a display disposed between the front cover and the support member to be visible from an outside through at least a part of the front cover and comprising:
a display panel,
a conductive sheet that is disposed on a rear surface of the display panel and is disposed to be divided into a first portion and a second portion through a slit, and
a flexible printed circuit board (FPCB) that extends from the display panel and is disposed so as to be folded to face at least a part of the conductive sheet; and
a wireless communication circuit electrically connected to the first conductive portion,
wherein the FPCB is disposed to overlap at least partial regions of the first portion and the second portion as the front cover is viewed from above,
wherein the first portion and the second portion are electrically connected to a ground of the FPCB through regions disposed to overlap each other, and
wherein the conductive sheet is disposed to have substantially a same size as the display panel.

18. The electronic device of claim 17, wherein the wireless communication circuit is configured to transmit and/or receive a wireless signal of a first frequency band through the first conductive portion.

19. The electronic device of claim 18, wherein a resonance frequency formed between the conductive sheet and the second conductive portion is operated in a band different from the first frequency band.

20. An electronic device comprising:
a housing including:
a front cover,
a rear cover located on an opposite side of the front cover, and
a lateral member surrounding a space between the front cover and the rear cover, the lateral member having a first conductive portion formed on at least a portion thereof;
a support member disposed in the space of the housing and including a second conductive portion having therein at least one opening;
a display disposed to be visible from an outside through at least a part of the front cover between the front cover and the support member and including:
a display panel,
a conductive sheet that is disposed on a rear surface of the display panel, and
a flexible printed circuit board (FPCB) that extends from the display panel, is disposed so as to be folded to face a rear surface of the display, and includes a ground layer having substantially a same size as a remaining region of the display panel excluding the conductive sheet; and
a wireless communication circuit electrically connected to the first conductive portion,
wherein the FPCB is disposed beside and adjacent to the conductive sheet in case the front cover is viewed from above, the FPCB being electrically connected to the conductive sheet through an electric connecting member that extends from the FPCB.

* * * * *